United States Patent
Itaya

(10) Patent No.: US 10,090,679 B2
(45) Date of Patent: Oct. 2, 2018

(54) VOLTAGE CONTROLLER AND VOLTAGE MONITORING DEVICE

(71) Applicant: MITSUBISHI ELECTRIC CORPORATION, Chiyoda-ku, Tokyo (JP)

(72) Inventor: Nobuhiko Itaya, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 217 days.

(21) Appl. No.: 14/911,698

(22) PCT Filed: Aug. 30, 2013

(86) PCT No.: PCT/JP2013/073368
§ 371 (c)(1),
(2) Date: Feb. 11, 2016

(87) PCT Pub. No.: WO2015/029227
PCT Pub. Date: Mar. 5, 2015

(65) Prior Publication Data
US 2016/0233681 A1    Aug. 11, 2016

(51) Int. Cl.
*H02J 3/38*     (2006.01)
*H02J 3/12*     (2006.01)
*H02J 13/00*    (2006.01)

(52) U.S. Cl.
CPC .............. *H02J 3/383* (2013.01); *H02J 3/12* (2013.01); *H02J 13/0006* (2013.01);
(Continued)

(58) Field of Classification Search
None
See application file for complete search history.

(56) References Cited

U.S. PATENT DOCUMENTS 9,329,619 B1 *   5/2016   Cloutier ............... G06F 1/00
9,608,462 B2 *   3/2017   Ishibashi ............ H02J 7/0052
(Continued)

FOREIGN PATENT DOCUMENTS

CN    102122819 A    7/2011
JP    05-292670 A    11/1993
(Continued)

OTHER PUBLICATIONS

International Search Report (PCT/ISA/210) dated Sep. 24, 2013, by the Japanese Patent Office as the International Searching Authority for International Application No. PCT/JP2013/073368.
(Continued)

*Primary Examiner* — Thienvu Tran
*Assistant Examiner* — David M Stables
(74) *Attorney, Agent, or Firm* — Buchanan Ingersoll & Rooney PC

(57) ABSTRACT

A voltage controller includes: a voltage adjusting unit that controls a voltage controller that changes a voltage of a bus, to which a plurality of power distribution lines are connected, such that the voltage of the bus is within a target voltage range; a communication processing unit that communicates with a voltage controller that controls a voltage control device connected to the power distribution line or a voltage monitoring device that is installed on the power distribution line to measure the voltage at an installation site; a target-voltage-range change request processing unit that transmits a change-possibility confirmation for inquiring about whether the target voltage range can be changed to the voltage monitoring device connected to another power distribution line, via the communication processing unit, and determines whether to change the target voltage range according to a response to the change-possibility confirmation.

12 Claims, 11 Drawing Sheets

(52) U.S. Cl.
CPC ............ *Y02E 10/563* (2013.01); *Y02E 40/72* (2013.01); *Y02E 60/74* (2013.01); *Y04S 10/123* (2013.01); *Y04S 10/30* (2013.01)

(56) References Cited

U.S. PATENT DOCUMENTS

| | | | | |
|---|---|---|---|---|
| 2012/0271479 | A1* | 10/2012 | Schmid | H02J 3/18 700/298 |
| 2013/0311792 | A1* | 11/2013 | Ponnathota | G06F 1/26 713/300 |
| 2014/0060100 | A1* | 3/2014 | Bryson | H02J 3/385 62/235.1 |
| 2014/0277796 | A1* | 9/2014 | Peskin | G05B 13/04 700/291 |
| 2014/0288725 | A1 | 9/2014 | Itaya | |
| 2014/0289541 | A1* | 9/2014 | Svendsen | G06F 1/3296 713/320 |
| 2015/0069950 | A1* | 3/2015 | Ishibashi | H02J 3/32 320/101 |

FOREIGN PATENT DOCUMENTS

| | | |
|---|---|---|
| JP | 06-269138 A | 9/1994 |
| JP | 07-336890 A | 12/1995 |
| JP | 09-322404 A | 12/1997 |
| JP | H11-024763 A | 1/1999 |
| JP | 11-289663 A | 10/1999 |
| JP | 11-332103 A | 11/1999 |
| JP | 2005-269744 A | 9/2005 |
| JP | 2006-325380 A | 11/2006 |
| JP | 2007-074846 A | 3/2007 |
| JP | 2010-183701 A | 8/2010 |
| WO | 03/073176 A1 | 9/2003 |
| WO | WO 2013/065114 A1 | 5/2013 |

OTHER PUBLICATIONS

Office Action (First Office Action) dated Sep. 15, 2017, by the State Intellectual Property Office (SIPO) of the People's Republic of China in corresponding Chinese Patent Application No. 201380079119.6, and an English Translation of the Office Action.

* cited by examiner

VOLTAGE CONTROLLER AND VOLTAGE MONITORING DEVICE

FIELD

The present invention relates to a voltage controller and a voltage monitoring device that control the voltage of a power distribution system.

BACKGROUND

A power distribution system is generally constructed to include a high-voltage system (generally, 6600 volts) and a low-voltage system (for example, 100 volts to 200 volts), and a receiving end of a general consumer is connected to the low-voltage system. An electric power provider is required to maintain the voltage at the receiving end of a general consumer within an appropriate range (for example, in the case of receiving 100 volts, the voltage is maintained at 95 volts to 107 volts). Therefore, the electric power provider adjusts, in order to maintain the appropriate voltage at the receiving end of a general consumer, a control amount of a voltage control device (for example, an LRT (Load Ratio Control Transformer: transformer with on-load tap-changing device) or an SVR (Step Voltage Regulator: step voltage regulator)) connected to the high-voltage system. The voltage of the voltage control device is controlled by a voltage controller integrated therein or attached thereto.

A transformer-type voltage control device such as the LRT or SVR is installed for the purpose of changing the load-side voltage by a tapping operation based on LDC (Line Drop Compensator) control to adjust the voltage at all points on the load side within an appropriate range. The LDC control here is for calculating an adequate load-side voltage for adjusting the voltage at all points on the load side within an appropriate range, based on an assumption that as an electric current increases, the voltage at the end of a distribution line decreases, by using the voltage measured by the voltage control device and electric current information. The transformer-type voltage control device generally needs to suppress the change of a tap position to 30 taps or less per day on average, in order to prevent wear of the device.

The LDC control is based on the assumption that load distribution of the power distribution system is uniform, that is, the voltage at each point of the power distribution system changes in the same direction with passage of time. However, in recent years, there is a tendency that the load distribution of the power distribution system largely varies non-uniformly with passage of time, due to diversification of how electricity is used and popularization of a dispersed power system by means of photovoltaic power generation and the like. Therefore, it is difficult to estimate voltage conditions of the entire power distribution system only based on the voltage measured by the voltage control device and the current information, and maintenance at an appropriate voltage has become an issue.

Therefore, such a mechanism has been proposed that measurement information of the voltage and current at various points of the power distribution system is centralized into a so-called "central apparatus (centralized voltage controller)" via a communication network and integrated, and a target voltage is instructed from the central apparatus (the centralized voltage controller) to each of the voltage controllers.

Furthermore, in order to cope with a rapid fluctuation of the voltage associated with changes of a photovoltaic power generation amount due to the movement of clouds, application of a reactive-power-adjusting-type voltage control device such as an SVC (Static Var Compensator) or a power conditioner for photovoltaic power generation (hereinafter, "PCS (Power Conditioning System)") or the like to the power distribution system has been studied. Regarding the reactive-power-adjusting-type voltage control device, when a capacity (VA) is increased, the cost and the installation space also increase. Therefore, in the power distribution system, a single device is not suitable to cope with large voltage fluctuations, and thus its basic use is to absorb voltage fluctuations in a matter of seconds.

However, even with a small capacity, dealing with large voltage fluctuations in an order of time, for example in a minute or more, has been expected, by cooperatively operating a plurality of reactive-power-adjusting-type voltage control devices by the central apparatus (the centralized voltage controller). For example, if a PCS is essential to photovoltaic power generation, it can be expected that an additional measure against the voltage problem, such as installation of a separate SVC, is made unnecessary by utilizing such cooperative control with respect to the plural power conditioning systems.

In this manner, in a state where a plurality of voltage control devices are installed in one power distribution line, it has been expected to apply a mechanism, in which the central apparatus (the centralized voltage controller) ascertains the voltage conditions of the entire power distribution system and issues an appropriate command to each of the voltage controllers, to the power distribution system in order to realize the cooperative operation between the voltage control devices.

However, the central apparatus (the centralized voltage controller) needs to regularly collect the voltage and current information at each point of the power distribution system, and the amount of information is very large. Therefore, in order to cope with a case in which the voltage fluctuates largely in several tens of seconds to several minutes, a high-speed communication network such as an optical network is required. A high-speed server and the like are also required for the central apparatus (the centralized voltage controller). Further, it is required to ensure, operate, and maintain an installation space of the central apparatus (the centralized voltage controller) and change facility data in accordance with the change of devices such as the voltage control device. At the time of introduction thereof, a scale merit is required, and for example, the system needs to be installed for each prefecture.

On the other hand, there are not many power distribution systems requiring centralized voltage control actually using the central apparatus (the centralized voltage controller) at present. It is anticipated that the number of power distribution systems requiring the centralized voltage control will increase considerably within the next 20 years. However, the rate thereof in the entire power distribution system is expected to remain a small part thereof.

Therefore, a voltage control method that can start from a small scale and can be used even in a large scale, without using a central apparatus (the centralized voltage controller) and a high-speed communication network, and has also small operation maintenance cost has been desired. As a method thereof, an autonomous and cooperative power-distribution-system voltage controller that realizes a cooperative operation among the voltage controllers by performing communication among a plurality of the voltage controllers with a small amount of information can be considered.

CITATION LIST

Patent Literature

Patent Literature 1: Japanese Patent Application Laid-open No. H11-289663

SUMMARY

Technical Problem

The present invention has been achieved in view of the above problems, and an object of the present invention is to provide a voltage controller and a power-distribution-system voltage control system that achieve stabilization of voltage control in a power distribution system.

Solution to Problem

In order to solve the aforementioned problems, a voltage controller according to one aspect of the present invention is so constructed as to include: a voltage adjusting unit that controls a voltage controller that changes a voltage of a bus, to which a plurality of power distribution lines are connected, such that the voltage of the bus is within a target voltage range; a communication processing unit that communicates with a voltage monitoring device, which is a voltage controller that controls a voltage control device connected to the power distribution line or a voltage sensor that is installed on the power distribution line to measure a voltage at its installation site; a target-voltage-range change request processing unit, which, when having received a change request of the target voltage range from the voltage monitoring device, transmits a change-possibility confirmation for inquiring about whether the target voltage range can be changed to the voltage monitoring device connected to another power distribution line different from the power distribution line, to which the voltage monitoring device having transmitted the change request is connected, via the communication processing unit, and determines whether to change the target voltage range according to a response to the change-possibility confirmation from the voltage monitoring device; and a target-voltage-range change processing unit that changes the target voltage range when the target-voltage-range change request processing unit determines to change the target voltage range.

Advantageous Effects of Invention

According to the present invention, occurrence of a hunting phenomenon can be prevented and stable voltage control can be achieved.

DESCRIPTION OF EMBODIMENTS

Exemplary embodiments of a voltage controller and a voltage monitoring device according to the present invention will be explained below in detail with reference to the accompanying drawings. The present invention is not limited to the embodiments.

First Embodiment

Figure 1:
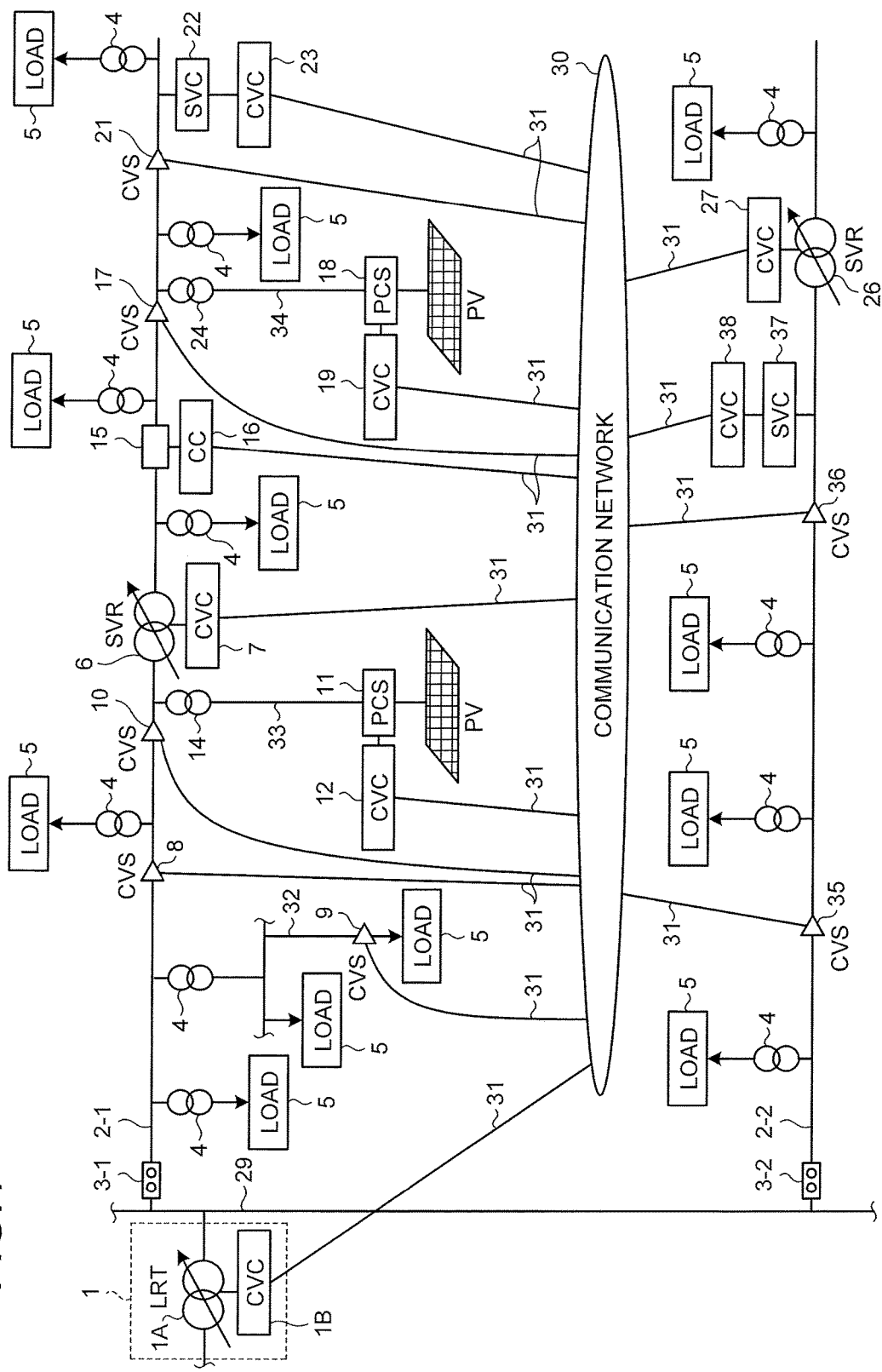
FIG. 1 is a diagram illustrating an example of a configuration of a power-distribution-system voltage control system according to an embodiment.

FIG. 1 is a diagram illustrating an example of a configuration of a power-distribution-system voltage control system according to a first embodiment of the present invention. In FIG. 1, a power distribution transformer 1 is installed, for example, in an electric power substation, and includes an LRT (Load Ratio Control Transformer: on-load tap-changing transformer) 1A that can change a secondary-side voltage in a state with a load current being applied, and a cooperative voltage controller (CVC) 1B that controls the LRT 1A by adjusting a tap position of the LRT 1A.

A bus 29 is connected to a secondary side of the power distribution transformer 1, and power distribution lines 2-1 and 2-2 are connected to the bus 29. The power distribution lines 2-1 and 2-2 are high-voltage power distribution lines of a high-voltage system (the voltage level is 6600 volts). In FIG. 1, two power distribution lines 2-1 and 2-2 are illustrated. However, the power distribution lines can be three or more. An end of the power distribution line 2-1 is connected to the bus 29 via a breaker 3-1, and an end of the power distribution line 2-2 is connected to the bus 29 via a breaker 3-2.

Cooperative voltage sensors (CVS) 8, 10, 17 and 21 are connected to the power distribution line 2. The cooperative voltage sensors (CVS) 8, 10, 17 and 21 can measure the voltage at respective installation sites (own terminals) thereof. In the present embodiment, voltage control of the power distribution system is executed by using only a voltage measurement value without using a current measurement value. This is because the current measurement value may become very small according to a measurement point due to recent popularization of a dispersed power system such as photovoltaic power generation, and a large error may be contained in the current measurement value. The cooperative voltage sensors (CVS) 8, 10, 17 and 21 are respectively connected to a communication network 30 via, for example, a network cable 31.

The power distribution line 2-1 is connected with, for example, an SVR (Step Voltage Regulator: step voltage regulator) 6 for compensating a voltage drop as a voltage control device. The SVR 6 is connected with a cooperative voltage controller (CVC) 7 that controls the SVR 6. For example, the cooperative voltage controller (CVC) 7 can be provided integrally with or adjacent to the SVR 6. The cooperative voltage controller (CVC) 7 controls the SVR 6 by adjusting a control amount of the SVR 6, specifically, by adjusting a tap position thereof. The SVR 6 measures, for example, both the voltage and the current, at its installation site (its own terminal) in the power distribution line 2-1. The cooperative voltage controller (CVC) 7 is connected to the communication network 30 via, for example, the network cable 31.

The power distribution line 2-1 is connected with, for example, a static var compensator (SVC) 22 as the voltage control device. The static var compensator (SVC) 22 is connected with a cooperative voltage controller (CVC) 23 that controls the static var compensator (SVC) 22. The cooperative voltage controller (CVC) 23 can be provided integrally with or adjacent to the static var compensator (SVC) 22. The cooperative voltage controller (CVC) 23 controls the static var compensator (SVC) 22 by adjusting a control amount of the static var compensator (SVC) 22, specifically, by adjusting a reactive power output. The static var compensator (SVC) 22 measures, for example, both the voltage and the current, at its installation site (its own terminal) in the power distribution line 2-1. The cooperative voltage controller (CVC) 23 is connected to the communication network 30 via, for example, the network cable 31.

A switch 15 is provided on the cable of the power distribution line 2-1, for example. In a state with the switch 15 being closed, an upstream side (the side on which the power distribution transformer 1 is provided, that is, a power supply side) of the switch 15 on the power distribution line 2-1 and a downstream side (a load side) thereof are electrically connected. In a state with the switch 15 being open, the downstream side is detached from the upstream side. The switch 15 is connected with a connection controller (CC) 16. The connection controller (CC) 16 is connected to the communication network 30 via, for example, the network cable 31. In the state with the switch 15 being open, the connection controller (CC) 16 interrupts communication between cooperative voltage controllers (CVC) 12 and 19 described later, but in the state with the switch 15 being closed, the connection controller (CC) 16 relays communication between the cooperative voltage controllers (CVC) 12 and 19. That is, the connection controller (CC) 16 has a function of interrupting the communication and a function of relaying the communication, and reflects the switching state of the switch 15 in a communication path between the cooperative voltage controllers (CVC) 12 and 19.

The power distribution line 2-1 is connected with a power distribution line 32 having a lower voltage than the power distribution line 2-1 via a transformer 4, and the power distribution line 32 is connected with, for example, a cooperative voltage sensor (CVS) 9. The power distribution line 32 is a low-voltage power distribution line with the voltage level being, for example, 100 volts to 200 volts. The cooperative voltage sensor (CVS) 9 is connected to the communication network 30 via, for example, the network cable 31. A load 5 is connected to the power distribution line 32.

The power distribution line 2-1 is connected with a power distribution line 33 having a lower voltage than the power distribution line 2-1 via a transformer 14. The power distribution line 33 is connected with a power conditioner 11 (hereinafter, "PCS (Power Conditioning System) 11"), for example, for photovoltaic power generation, as a voltage control device. The PCS 11 is connected with a cooperative voltage controller (CVC) 12 that controls the PCS 11 and a photovoltaic cell (PV) that is a power generation source. The cooperative voltage controller (CVC) 12 can be provided, for example, integrally with or adjacent to the PCS 11. The cooperative voltage controller (CVC) 12 controls the PCS 11 by adjusting a control amount from the PCS 11, specifically, by adjusting reactive power output by the PCS. The PCS 11 measures, for example, both the voltage and the current at its installation site (its own terminal) in the power distribution line 33. The cooperative voltage controller (CVC) 12 is connected to the communication network 30 via, for example, the network cable 31.

The power distribution line 2-1 is connected with a power distribution line 34 having a lower voltage than the power distribution line 2-1 via a transformer 24. The power distribution line 34 is a low-voltage power distribution line. However, the voltage level can be the same level or higher than the power distribution line 32. The power distribution line 34 is connected with a power conditioner 18 (hereinafter, "PCS (Power Conditioning System) 18"), for example, for photovoltaic power generation, as a voltage control device. The PCS 18 is connected with a cooperative voltage controller (CVC) 19 that controls the PCS 18 and a power generation source (PV). The cooperative voltage controller (CVC) 19 can be provided integrally with or adjacent to the PCS 18. The cooperative voltage controller (CVC) 19 controls the PCS 18 by adjusting a control amount of the PCS 18, specifically, by adjusting a reactive power output. The PCS 18 measures, for example, both the voltage and the current at its installation site (its own terminal) in the power distribution line 34. The cooperative voltage controller (CVC) 19 is connected to the communication network 30 via, for example, the network cable 31.

The power distribution line 2-2 is connected with cooperative voltage sensors (CVS) 35 and 36. The cooperative voltage sensors (CVS) 35 and 36 can measure the voltage at their respective installation sites (their own terminals). The cooperative voltage sensors (CVS) 35 and 36 are respectively connected to the communication network 30 via, for example, the network cable 31.

The power distribution line 2-2 is connected with an SVR 26. The SVR 26 is connected with a cooperative voltage controller (CVC) 27 that controls the SVR 26. The cooperative voltage controller (CVC) 27 can be provided, for example, integrally with or adjacent to the SVR 26. The cooperative voltage controller (CVC) 27 controls the SVR 26 by adjusting a control amount of the SVR 26, specifically, by adjusting a tap position thereof. The SVR 26 measures, for example, both the voltage and the current at its installation site (its own terminal) in the power distribution line 2-2. The cooperative voltage controller (CVC) 27 is connected to the communication network 30 via, for example, the network cable 31.

The power distribution line 2-2 is connected with a static var compensator (SVC) 37. The static var compensator (SVC) 37 is connected with a cooperative voltage controller (CVC) 38 that controls the static var compensator (SVC) 37.

The cooperative voltage controller (CVC) 38 can be provided, for example, integrally with or adjacent to the static var compensator (SVC) 37. The cooperative voltage controller (CVC) 38 controls the static var compensator (SVC) 37 by adjusting a control amount of the static var compensator (SVC) 37, specifically, by adjusting a reactive power output. The static var compensator (SVC) 37 measures, for example, both the voltage and the current at its installation site (its own terminal) in the power distribution line 2-2. The cooperative voltage controller (CVC) 38 is connected to the communication network 30 via, for example, the network cable 31.

The SVR 6 and the cooperative voltage controller (CVC) 7 are provided rather on a side closer to the power supply than the PCS 11 and the cooperative voltage controller (CVC) 12, the PCS 18 and the cooperative voltage controller (CVC) 19, the static var compensator (SVC) 22 and the cooperative voltage controller (CVC) 23, and the cooperative voltage sensors (CVS) 8, 9, 10, 17, and 21. The SVR 26 and the cooperative voltage controller (CVC) 27 are provided rather on a side closer to the power supply than the static var compensator (SVC) 37 and the cooperative voltage controller (CVC) 38, and the cooperative voltage sensors (CVS) 35 and 36. In FIG. 1, it is illustrated that the loads 5 are connected to the power distribution line 2-1 or 2-2 via the transformers 4.

In this manner, the cooperative voltage controller (CVC) is largely divided into the transformer-type cooperative voltage controllers (CVC) 1B, 7, and 27 that issue a command respectively to the transformer-type voltage control devices (the LRT 1A, the SVR 6, and the SVR 26), and the reactive-power-adjusting-type cooperative voltage controllers (CVC) 12, 19, 23, and 38 that issue a command respectively to the reactive-power-adjusting-type voltage control devices (the PCS 11, the PCS 18, the SVC 22, and the SVC 37). FIG. 1 illustrates an example of an arrangement configuration of a cooperative voltage controller (CVC). The transformer-type voltage control device has voltage control characteristics of uniformly moving the voltage up and down on the load side by changing the tap position, but hardly moving the voltage up and down on the power supply side. The reactive-power-adjusting-type voltage control device has voltage control characteristics of uniformly moving the voltage up and down on the load side by controlling the reactive power, and moving the voltage up and down on the power supply side in proportion to line impedance from the power distribution transformer 1. Therefore, in the reactive-power-adjusting-type voltage control device, a voltage variation range with respect to the same reactive power change decreases as it comes closer to the power distribution transformer 1.

Configurations of the cooperative voltage sensors (CVS) 8, 9, 10, 17, 21, 35, and 36 are described next. For example, the cooperative voltage sensor (CVS) 8 is described below; however, the configurations of the cooperative voltage sensors (CVS) 9, 10, 17, 21, 35, and 36 are identical thereto. The cooperative voltage sensor (CVS) 8 can perform measurement, edition, and monitoring of the voltage, and can issue a target-voltage-range change request. Measurement here is to measure the voltage at its own terminal, edition is to calculate, for example, a voltage moving average value, and monitoring is to monitor voltage fluctuations. The target-voltage-range change request is issued when the latest voltage moving average value deviates from a range of appropriate voltage upper/lower limits, as described below.

Figure 2:
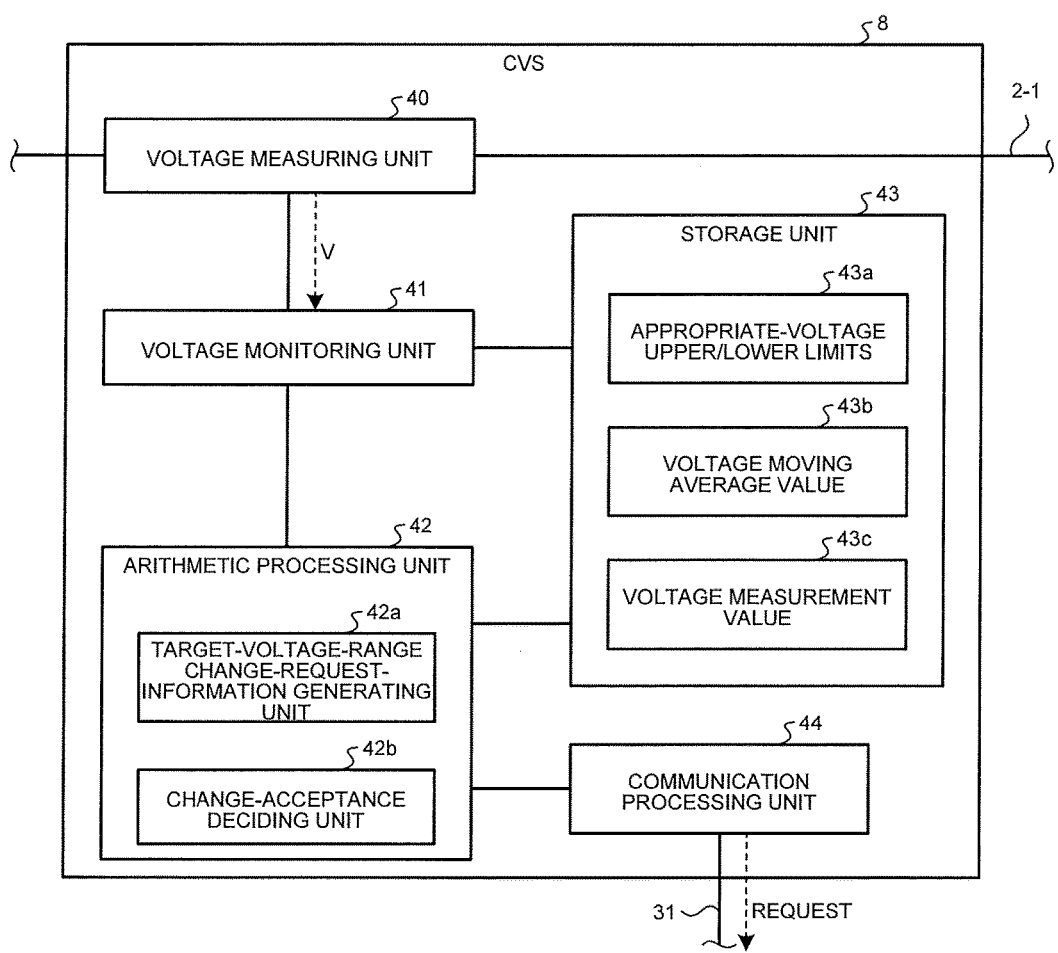
FIG. 2 is a diagram illustrating an example of a configuration of a cooperative voltage sensor (CVS) 8.

FIG. 2 is a diagram illustrating an example of a configuration of the cooperative voltage sensor (CVS) 8. As illustrated in FIG. 2, the cooperative voltage sensor (CVS) 8 includes a voltage measuring unit 40, a voltage monitoring unit 41, an arithmetic processing unit 42, a storage unit 43, and a communication processing unit 44.

The voltage measuring unit 40 is connected to the power distribution line 2-1 to measure the voltage of the power distribution line 2-1 at a connected site, for example, for each preset cycle.

The voltage monitoring unit 41 acquires the voltage measurement value (V) measured by the voltage measuring unit 40, for example, for each preset cycle, and sends the acquired voltage measurement value (V) to the arithmetic processing unit 42.

The arithmetic processing unit 42 performs various kinds of arithmetic processing and the like. Specifically, the arithmetic processing unit 42 stores the latest voltage measurement value in the storage unit 43 as a voltage measurement value 43c, every time the latest voltage measurement value is acquired from the voltage monitoring unit 41. The voltage measurement value 43c is stored, for example, for a predetermined period of time. Further, the arithmetic processing unit 42 calculates a voltage moving average value 43b generally by using the past voltage measurement values 43c already stored in the storage unit 43 and the latest voltage measurement value 43c, every time the latest voltage measurement value is acquired from the voltage monitoring unit 41, and stores the voltage moving average value 43b in the storage unit 43. The voltage moving average value 43b is a mean value of the voltage measurement values 43c in the past predetermined period of time, based on the latest voltage measurement time point as a reference, and is calculated by using the past voltage measurement values 43c and the latest voltage measurement value 43c. The voltage moving average value 43b is stored, for example, for a predetermined period of time. Appropriate-voltage upper/lower limits 43a are stored beforehand in the storage unit 43. The appropriate-voltage upper/lower limits 43a include an appropriate voltage upper limit and an appropriate voltage lower limit, and define an appropriate voltage range to be maintained for a predetermined section of the power distribution line 2-1 including the voltage measurement point of the cooperative voltage sensor (CVS) 8. The appropriate-voltage upper/lower limits 43a can be set variably in terms of time.

The arithmetic processing unit 42 has a function of issuing a target-voltage change request, in addition to the arithmetic processing function described above. That is, the arithmetic processing unit 42 includes a target-voltage-range change request information generating unit 42a, thereby to generate target-voltage-range change request information, when, for example, the latest voltage moving average value 43b deviates from the range of the appropriate-voltage upper/lower limits 43a. At the time of determining a deviation from the range of the appropriate-voltage upper/lower limits 43a, a value other than the voltage moving average value 43b can be used. For example, the voltage is measured periodically, and if a deviation from the range of the appropriate-voltage upper/lower limits occurs continuously for more than a predetermined number of times, it can be determined as abnormal. Any determination method can be used, so long as it is not determined as a deviation if the deviation is resolved in a matter of seconds, and it is determined as a deviation only when the deviation occurs for a certain long period of time.

The arithmetic processing unit 42 includes a change-acceptance determining unit 42b. The change-acceptance determining unit 42b determines among options including at least "acceptable" and "unacceptable" with respect to reception of a change-possibility confirmation, which is transmitted before the cooperative voltage controller (CVC) 1B that controls the LRT 1A changes a target voltage range.

The arithmetic processing unit 42 transmits the target-voltage-range change request information to a preset cooperative voltage controller (CVC), in the case of the cooperative voltage sensor (CVS) 8, to the cooperative voltage controller (CVC) 12, via the communication processing unit 44. Note that the communication processing unit 44 is connected to the network cable 31 to perform communication. The target-voltage-range change request information includes a change amount and a change direction of the voltage. The change direction represents an increase or a decrease. As described later, target-voltage upper/lower limits are predetermined respectively for each of the cooperative voltage controllers (CVC), and each cooperative voltage controller (CVC) executes voltage control such that the voltage at its own terminal is maintained within the range of its own target-voltage upper/lower limits. Upon reception of a target-voltage-range change request, the cooperative voltage controller (CVC) changes and resets the target-voltage upper/lower limits according to the request contents. The target voltage range can be represented by another form such as a target voltage upper limit or a target voltage lower limit and a width.

The configuration described above is identical for the cooperative voltage sensors (CVS) 10, 17, and 21. In FIG. 2, if the power distribution line 2-1 is changed to the power distribution line 32, the identical configuration can be used for the cooperative voltage sensor (CVS) 9, and if the power distribution line 2-1 is changed to the power distribution line 2-2, an identical configuration can be used for the cooperative voltage sensors (CVS) 35 and 36.

Configurations of the cooperative voltage controllers (CVC) 1B, 7, 12, 19, 23, 27, and 38 are described next. The cooperative voltage controllers (CVC) 1B, 7, 12, 19, 23, 27, and 38 perform collection, edition, and monitoring of voltage measurement values respectively from the voltage control devices (the LRT 1A, the SVR 6, the PCS 11, the PCS 18, the SVC 22, the SVR 26, and the SVC 37), and perform output or the like of a target-voltage value command to the voltage control devices. The cooperative voltage controllers (CVC) 12, 19, 23, and 38 also have a function of requesting a change of the target voltage range. However, the cooperative voltage controllers (CVC) 1B, 7, and 27 do not have the function of requesting a change of the target voltage range. Collection here is to acquire a voltage measurement value at its own terminal, which has been measured by the voltage control device, for example, for each preset cycle from the voltage control device. Edition is to calculate, for example, a voltage moving average value by using the collected voltage measurement values, and monitoring is to monitor voltage fluctuations at its own terminal. The target-voltage value command is a control command to be output to the voltage control device so that the voltage at its own terminal is within the range of the target-voltage upper/lower limits. The target-voltage-range change request is issued, for example, when the latest voltage moving average value deviates from the range of appropriate voltage upper/lower limits.

The configurations of the reactive-power-adjusting-type cooperative voltage controllers (CVC) 12, 19, 23 and 38 are described next. For example, the configuration of the cooperative voltage controller (CVC) 12 is described below; however, the configurations of the cooperative voltage controllers (CVC) 19, 23 and 38 are identical thereto.

Figure 3:
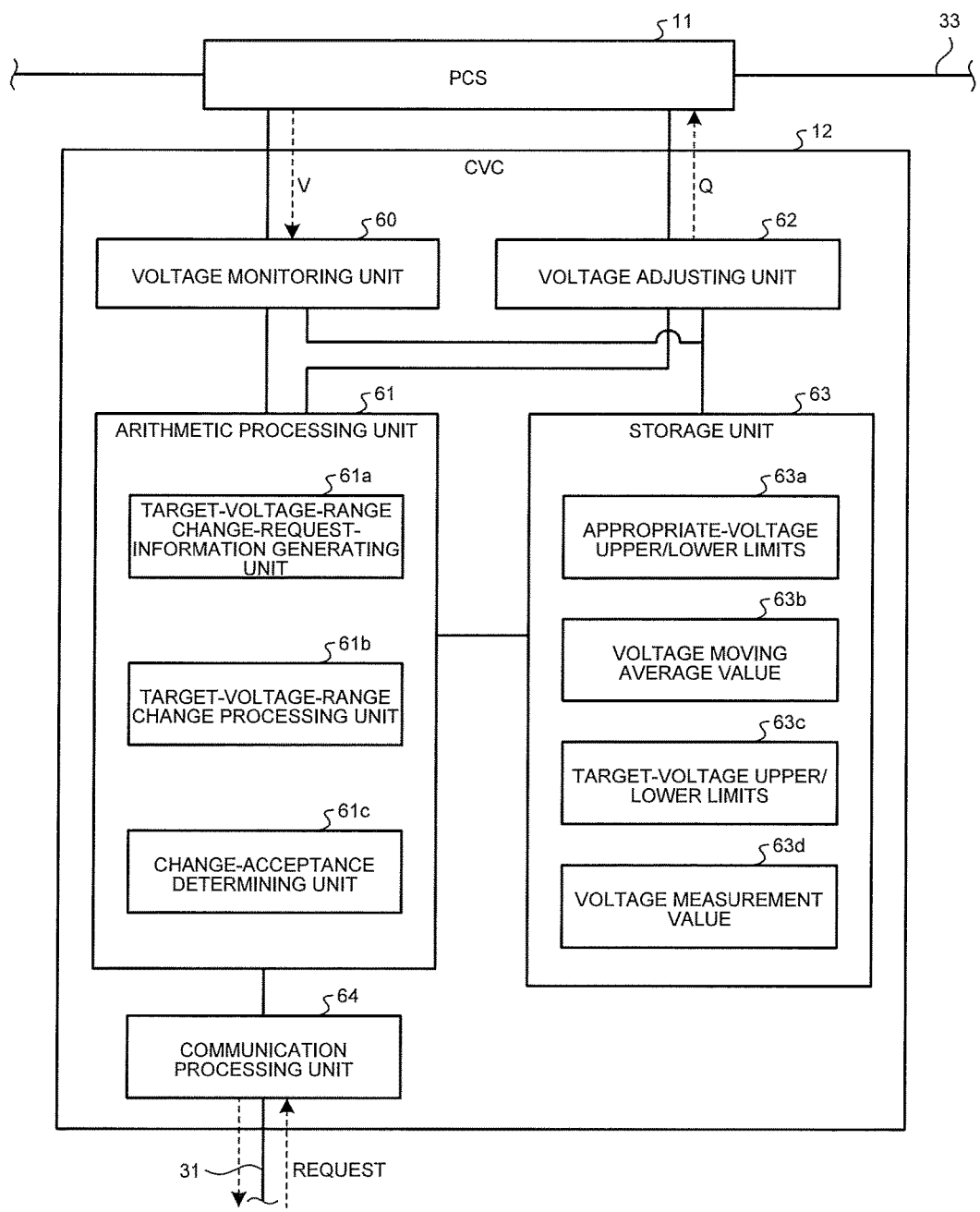
FIG. 3 is a diagram illustrating an example of a configuration of a cooperative voltage controller (CVC) 12.

FIG. 3 is a diagram illustrating an example of the configuration of the cooperative voltage controller (CVC) 12. As illustrated in FIG. 3, the cooperative voltage controller (CVC) 12 includes a voltage monitoring unit 60, an arithmetic processing unit 61, a voltage adjusting unit 62, a storage unit 63, and a communication processing unit 64.

The voltage monitoring unit 60 acquires a voltage measurement value (V) measured by the PCS 11, for example, for each preset cycle, and sends the voltage measurement value (V) to the arithmetic processing unit 61.

The arithmetic processing unit 61 performs various kinds of arithmetic processing and the like. Specifically, the arithmetic processing unit 61 stores the latest voltage measurement value in the storage unit 63 as a voltage measurement value 63d, every time the latest voltage measurement value is acquired from the voltage monitoring unit 60. The voltage measurement value 63d is stored for a predetermined period of time. Further, the arithmetic processing unit 61 calculates, for example, a voltage moving average value 63b generally by using the past voltage measurement values 63d already stored in the storage unit 63 and the latest voltage measurement value 63d, every time the latest voltage measurement value is acquired from the voltage monitoring unit 60, and stores the voltage moving average value 63b in the storage unit 63. The voltage moving average value 63b is a mean value of the voltage measurement values 63d in the past predetermined period of time, according to the latest voltage measurement time point as a reference, and is calculated by using the past voltage measurement values 63d and the latest voltage measurement value 63d. The voltage moving average value 63b is stored, for example, for a predetermined period of time. Appropriate-voltage upper/lower limits 63a are stored beforehand in the storage unit 63. The appropriate-voltage upper/lower limits 63a include an appropriate voltage upper limit and an appropriate voltage lower limit, and define an appropriate voltage range to be maintained for a predetermined section of the power distribution line 33 including the voltage measurement point of the PCS 11. The appropriate-voltage upper/lower limits 63a can be set variably in terms of time. Target-voltage upper/lower limits 63c are stored beforehand in the storage unit 63. The target-voltage upper/lower limits 63c include a target-voltage upper limit and a target-voltage lower limit, and define a control-target voltage range of the cooperative voltage controller (CVC) 12.

The arithmetic processing unit 61 includes a target-voltage-range change request information generating unit 61a. The target-voltage-range change request information generating unit 61a generates target-voltage-range change request information, for example, when the latest voltage moving average value 63b deviates from the range of the appropriate voltage upper/lower limits 63a. At the time of determining a deviation from the range of the appropriate voltage upper/lower limits 63a, a voltage average value other than the voltage moving average value 63b can be used, or the voltage at its own terminal (its installation site) can be used. The target-voltage-range change request information includes a change amount and a change direction of the voltage. The arithmetic processing unit 61 transmits the target-voltage-range change request information to a preset cooperative voltage controller (CVC), in the case of the cooperative voltage controller (CVC) 12, to the cooperative voltage controller (CVC) 1B via the communication processing unit 64. The communication processing unit 64 is connected to the network cable 31 to perform communication.

The arithmetic processing unit 61 includes a target-voltage-range change processing unit 61b. Upon reception of target-voltage-range change request information from another cooperative voltage controller (CVC) or the cooperative voltage sensor (CVS), the target-voltage-range change processing unit 61b can update and reset the target-voltage upper/lower limits 63c stored in the storage unit 63, on the basis of the change amount and the change direction of the voltage included in the target-voltage-range change request information. The communication processing unit 54 of the cooperative voltage controller (CVC) can transfer the target-voltage-range change request information received from a certain device to another device.

The arithmetic processing unit 61 includes a change-acceptance determining unit 61c similar to that of the cooperative voltage sensor (CVS).

The voltage adjusting unit 62 determines whether a voltage measurement value output from the voltage monitoring unit 60 is within the range of the target-voltage upper/lower limits 63c. If the voltage measurement value deviates from the range of the target-voltage upper/lower limits 63c, the voltage adjusting unit 62 controls reactive power output by the PCS 11 so as to maintain the voltage within the range of the target-voltage upper/lower limits 63c. The PCS 11 controls the voltage by generating the reactive power Q according to the control of the voltage adjusting unit 62. The reactive power Q is, for example, defined such that it has a negative value when the reactive power is fed to the power distribution system, and has a positive value when the reactive power is drawn in from the power distribution system. By generating the negative reactive power, that is, by feeding the reactive power to the power distribution system, the voltage can be increased. By generating the positive reactive power, that is, by drawing in the reactive power from the power distribution system, the voltage can be decreased.

Figure 4:
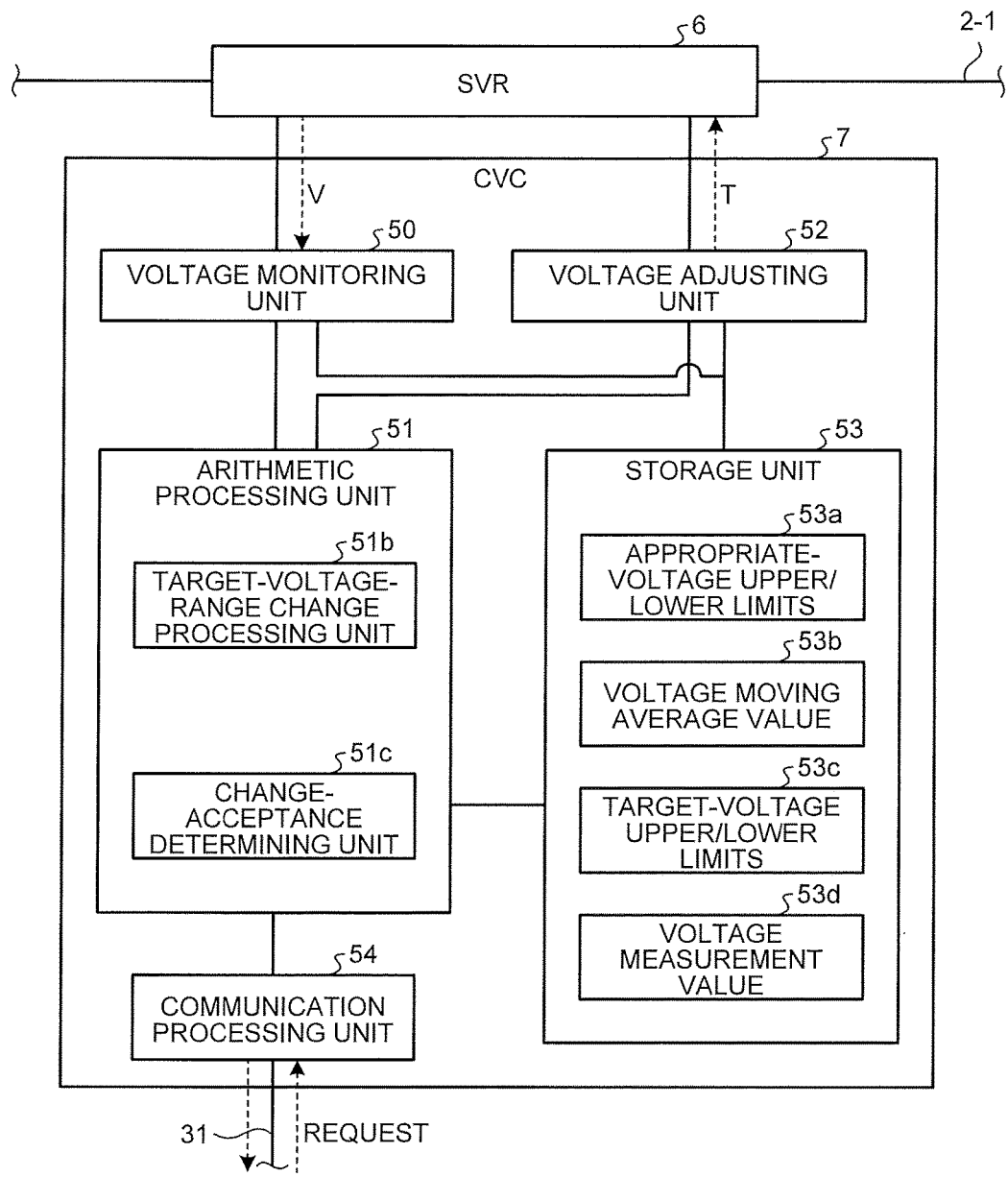
FIG. 4 is a diagram illustrating an example of a configuration of a cooperative voltage controller (CVC) 7.

The configuration of the transformer-type cooperative voltage controller (CVC) 7 is described next. FIG. 4 is a diagram illustrating an example of the configuration of the cooperative voltage controller (CVC) 7. As illustrated in FIG. 4, the cooperative voltage controller (CVC) 7 includes a voltage monitoring unit 50, an arithmetic processing unit 51, a voltage adjusting unit 52, a storage unit 53, and a communication processing unit 54.

The voltage monitoring unit 50 acquires a voltage measurement value (V) measured by the SVR 6, for example, for each preset cycle, and sends the acquired voltage measurement value (V) to the arithmetic processing unit 51.

The arithmetic processing unit 51 performs various kinds of arithmetic processing and the like. Specifically, the arithmetic processing unit 51 stores the latest voltage measurement value in the storage unit 53 (as a voltage measurement value 53d), every time the latest voltage measurement value is acquired from the voltage monitoring unit 50. The voltage measurement value 53d is stored, for example, for a predetermined period of time. Further, the arithmetic processing unit 51 calculates a voltage moving average value 53b generally by using the past voltage measurement values 53d already stored in the storage unit 53 and the latest voltage measurement value 53d, every time the latest voltage measurement value is acquired from the voltage monitoring unit 50, and stores the voltage moving average value 53b in the storage unit 53. The voltage moving average value 53b here is a mean value of the voltage measurement values 53d in the past predetermined period of time, based on the latest voltage measurement time point as a reference, and is calculated by using the past voltage measurement values 53d and the latest voltage measurement value 53d. The voltage moving average value 53b is stored, for example, for a predetermined period of time. Appropriate-voltage upper/lower limits 53a are stored beforehand in the storage unit 53. The appropriate-voltage upper/lower limits 53a include an appropriate voltage upper limit and an appropriate voltage lower limit, and define an appropriate voltage range to be maintained for a predetermined section of the power distribution line 2-1 including the voltage measurement point of the SVR 6. The appropriate-voltage upper/lower limits 53a can be set variably in terms of time. Target-voltage upper/lower limits 53c are stored beforehand in the storage unit 53. The target-voltage upper/lower limits 53c include a target-voltage upper limit and a target-voltage lower limit, and define a target voltage range of the cooperative voltage controller (CVC) 7.

The transformer-type cooperative voltage controller (CVC) 7 can have a configuration in which the target-voltage-range change request information generating unit is provided. It is assumed here that the transformer-type cooperative voltage controller (CVC) 7 neither issues nor relays the target-voltage-range change request from its own device.

The arithmetic processing unit 51 includes a target-voltage-range change processing unit 51b. Upon reception of target-voltage-range change request information from another cooperative voltage controller (CVC) or the cooperative voltage sensor (CVS), the target-voltage-range change processing unit 51b can update and reset the target-voltage upper/lower limits 53c stored in the storage unit 53, according to the change amount and the change direction of the voltage included in the target-voltage-range change request information.

The arithmetic processing unit 51 also includes a change-acceptance determining unit 51c similar to that of the cooperative voltage sensor (CVS) and the reactive-power-adjusting-type cooperative voltage controller (CVC).

The target-voltage-range change processing unit 51b receives target-voltage-range change request information from another cooperative voltage controller (CVC) or the cooperative voltage sensor (CVS), and changes the target-voltage upper/lower limits 53c.

The voltage adjusting unit 52 determines whether a voltage measurement value output from the voltage monitoring unit 50 is within the range of the target-voltage upper/lower limits 53c. If the voltage measurement value deviates from the range of the target-voltage upper/lower limits 53c, the voltage adjusting unit 52 adjusts the tap position of the SVR 6 so that the voltage is maintained within the range of the target-voltage upper/lower limits 53c. The SVR 6 controls the voltage by adjusting a tap position T according to the control of the voltage adjusting unit 52.

The configuration of the transformer-type cooperative voltage controller (CVC) 7 has been described. However, the configuration of the transformer-type cooperative voltage controller (CVC) 27 is identical thereto.

As is obvious from the above descriptions, the cooperative voltage sensor (CVS) and the cooperative voltage controller (CVC) installed on the power distribution line have a common function of monitoring the voltage at their own terminals and issuing a target-voltage-range change request, for example, if it is detected that the voltage moving average value has deviated from an appropriate range. When focusing attention on the common function, the CVS and the CVC can be combined together and referred to as "voltage monitoring device".

Figure 5:
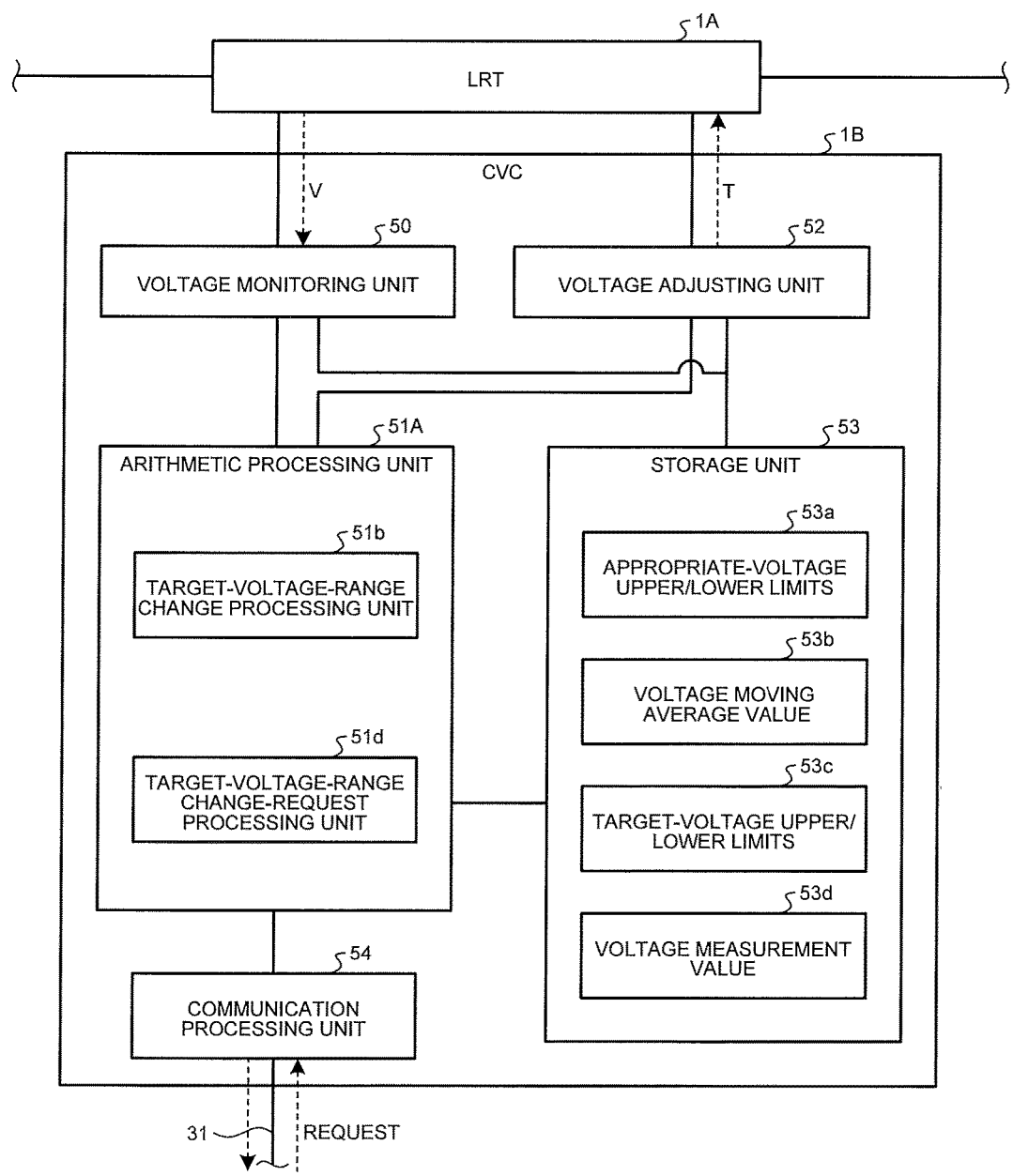
FIG. 5 is a diagram illustrating an example of a configuration of a cooperative voltage controller (CVC) 1B.
Figure 6:
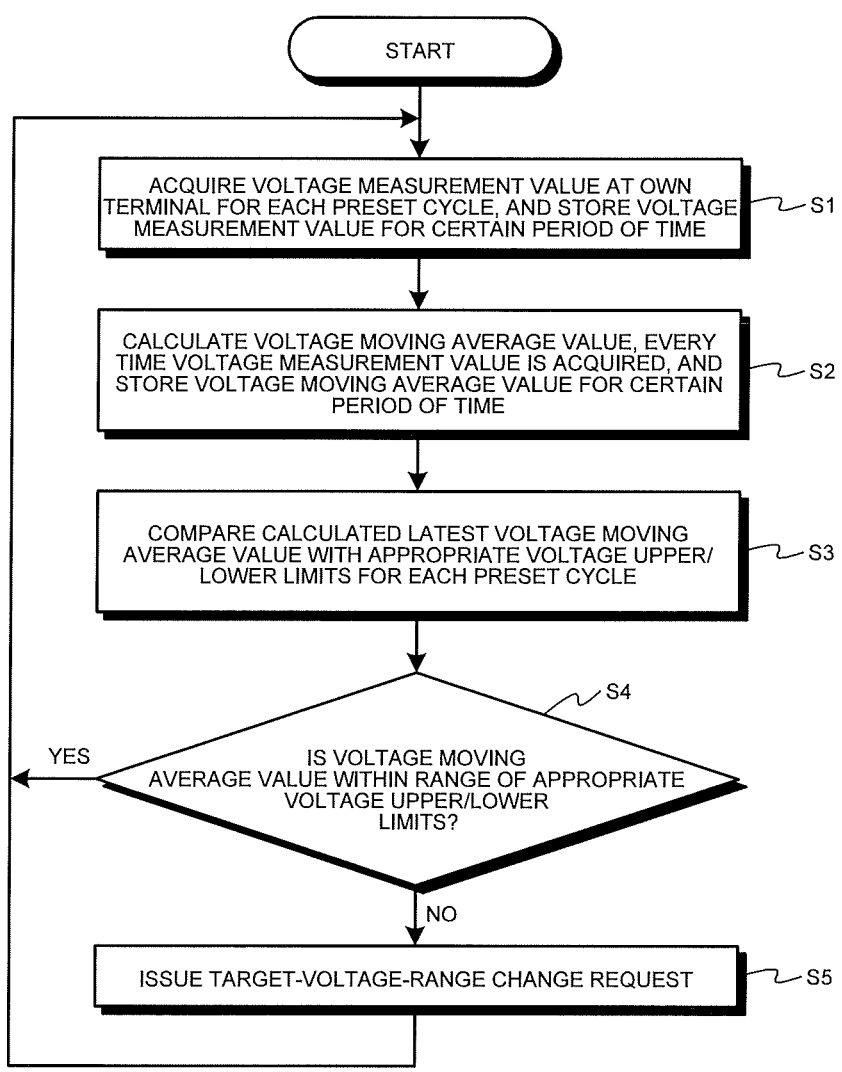
FIG. 6 is a flowchart illustrating a process of issuing a target-voltage-range change request.

The configuration of the transformer-type cooperative voltage controller (CVC) 1B is described next. FIG. 5 is a diagram illustrating an example of the configuration of the transformer-type cooperative voltage controller (CVC) 1B. As can be understood from a comparison between FIG. 5 and FIG. 4, the transformer-type cooperative voltage controller (CVC) 1B does not include the target-voltage-range change request information generating unit 51a, similarly to the transformer-type cooperative voltage controllers (CVC) 7 and 27 (FIG. 4). The transformer-type cooperative voltage controller (CVC) 1B does not include the change-acceptance determining unit 51c, but instead thereof, includes a target-voltage-range change request processing unit 51d. Because other parts of the configuration are common, explanations thereof are omitted, except for the target-voltage-range change request processing unit 51d.

Upon reception of a target-voltage-range change request information (a change amount and a change direction of the voltage), the target-voltage-range change request processing unit 51d determines as to whether a change of the target voltage range is acceptable according to the request contents. At the time of determining, the target-voltage-range change request processing unit 51d makes an inquiry about whether a change of the target voltage range is acceptable to the voltage monitoring devices (the CVS, the CVC) connected to another power distribution line different from the power distribution line, through which the target-voltage-range change request information has been transmitted, and determines according to response contents from the respective devices.

An operation of the power-distribution-system voltage control system according to the present embodiment is described next. A normal voltage control operation of the cooperative voltage controller (CVC) is described first.

The normal voltage control operation of the reactive-power-adjusting-type cooperative voltage controller (CVC) 12, 19, 23 and 38 is described. The normal voltage control operation is common to the cooperative voltage controllers (CVC) 12, 19, 23 and 38, and thus the voltage control operation is described without particularly adding reference signs. The reactive-power-adjusting-type cooperative voltage controller (CVC) monitors a voltage measurement value at its own terminal in a short cycle (for example, in a cycle of 100 milliseconds), compares the voltage measurement value with the target-voltage upper/lower limits to determine if there is a deviation of the voltage measurement value from the range of the target-voltage upper/lower limits. If the deviation continues, the reactive-power-adjusting-type cooperative voltage controller (CVC) adds or subtracts a deviation amount to or from a control amount, and if there is no deviation, resets the deviation amount. If the deviation amount exceeds a preset threshold, the reactive-power-adjusting-type cooperative voltage controller (CVC) commands a reactive-power to be output to the voltage control devices such as the PCS by PID (Proportional Integral Differential) control so as to adjust the voltage within the target-voltage upper/lower limits. Such control is executed by the voltage adjusting unit 62 (FIG. 3).

It is assumed that initial values of the target-voltage upper/lower limits of the reactive-power-adjusting-type cooperative voltage controller (CVC) (when a target-voltage-range change request has not been received) are values obtained by, for example, adding or subtracting a certain dead zone (for example, 0.5% of the voltage moving average value) to or from a moving average value of the voltage measurement value (for example, the voltage moving average value for one minute) at the own terminal. Accordingly, in a state where a target-voltage-range change request has not been received, an available capacity to generate reactive power on the positive side and the negative side is sufficient, and the reactive-power-adjusting-type cooperative voltage controller (CVC) operates to avoid a sudden change of the voltage at the own terminal.

The normal voltage control operation of the transformer-type cooperative voltage controller (CVC) 1B, 7 and 27 is described next. The normal voltage control operation is common to the cooperative voltage controllers (CVC) 1B, 7 and 27, and thus the voltage control operation is described without particularly adding reference signs. The transformer-type cooperative voltage controller (CVC) monitors a voltage measurement value at its own terminal in a short cycle (for example, in a cycle of one second), compares the voltage measurement value with the target-voltage-value upper/lower limits to determine if there is a deviation of the voltage measurement value. If the deviation continues, the transformer-type cooperative voltage controller (CVC) 7 adds or subtracts a deviation amount to or from a control amount, and if there is no deviation, resets the deviation amount. If the deviation amount exceeds a preset threshold, the transformer-type cooperative voltage controller (CVC) 7 issues a command to change the tap position so as to adjust the voltage within the target-voltage upper/lower limits. The threshold of a voltage integration value for determining the deviation amount can be set larger than that of the reactive-power-adjusting-type cooperative voltage controller (CVC), in order to reduce the number of tap operations. Such control is executed by the voltage adjusting unit 52 (FIG. 4, FIG. 5).

It is assumed that initial values of the target-voltage upper/lower limits of the transformer-type cooperative voltage controller (CVC) 7 (when a target-voltage-range change request has not been received) are values obtained by, for example, adding or subtracting a certain dead zone (for example, 1% of a set value) to or from a preset value or a value set according to the day of the week, a time zone, or the like. Accordingly, the voltage is maintained on the load side in a normal state where the target-voltage-range change request has not been issued.

An operation of the cooperative voltage sensor (CVS) or the cooperative voltage controller (CVC) to issue a target-voltage-range change request is described next. Because the transformer-type cooperative voltage controller (CVC) does not issue the target-voltage-range change request, the cooperative voltage controllers (CVC) and the cooperative voltage sensors (CVS) other than the cooperative voltage controllers (CVC) 1B, 7, and 27 perform the following operations.

A voltage monitoring function of the cooperative voltage sensor (CVS) or the cooperative voltage controller (CVC) is described first.

Figure 7:
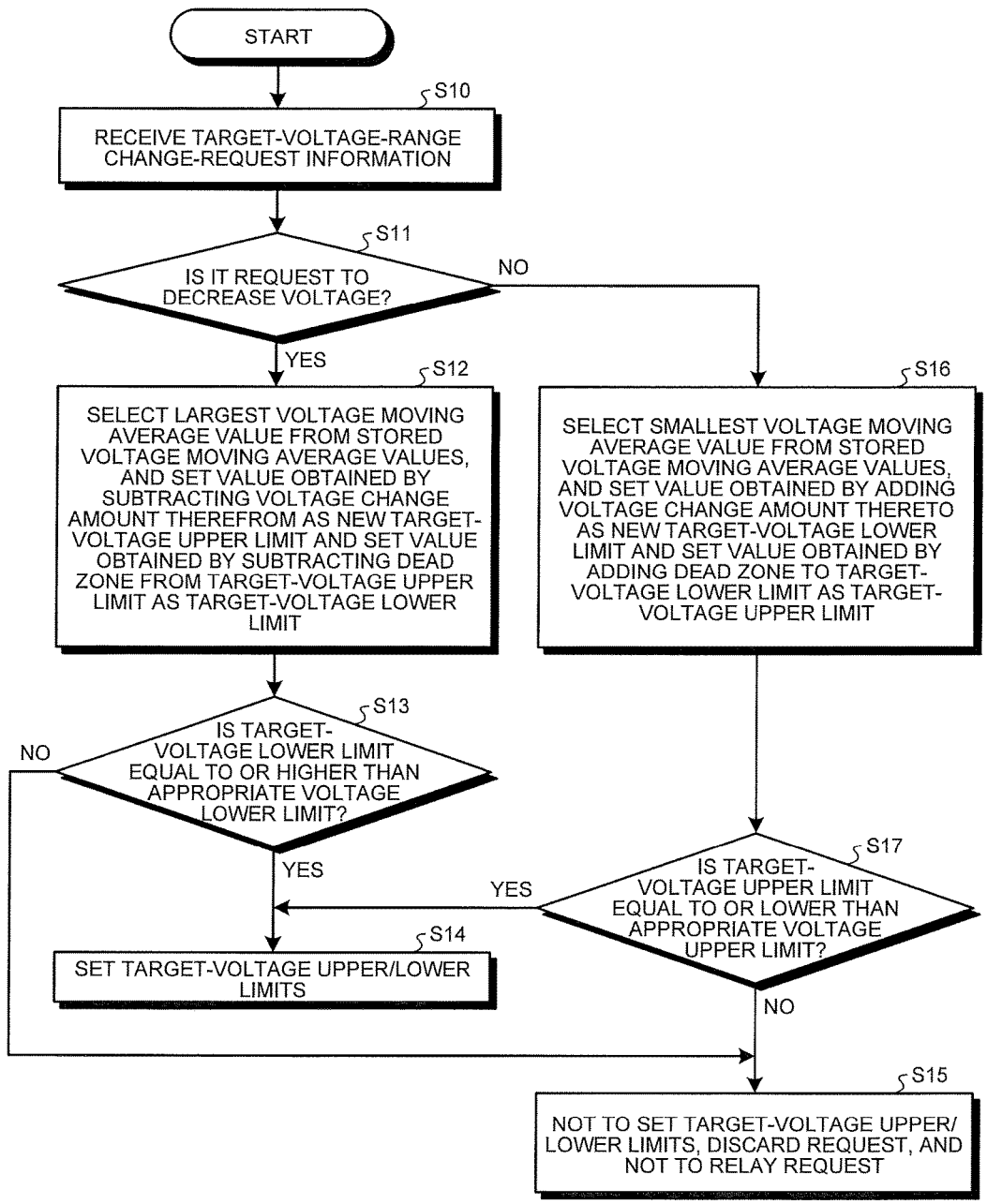
FIG. 7 is a flowchart illustrating a process of changing a target voltage range of a cooperative voltage controller (CVC) having received a target-voltage-range change request.

FIG. 7 is a flowchart illustrating a process of issuing a target-voltage change request. The cooperative voltage sensor (CVS) or the reactive-power-adjusting-type cooperative voltage controller (CVC) acquires a voltage measurement value at its own terminal for each preset cycle (for example, in a cycle of one second), and stores the voltage measurement value for the predetermined period of time (for example, for one minute) (S1). For example, in the cooperative voltage sensor (CVS) 8, the voltage monitoring unit 41 acquires a voltage measurement value at its own terminal for each preset cycle, and the voltage measurement value is stored in the storage unit 43 for the predetermined period of time. For example, in the cooperative voltage controller (CVC) 12, the voltage monitoring unit 60 acquires a voltage measurement value at the own terminal for each preset cycle, and the voltage measurement value is stored in the storage unit 63 for the predetermined period of time.

The cooperative voltage sensor (CVS) or the reactive-power-adjusting-type cooperative voltage controller (CVC) calculates, for example, the voltage moving average value (for example, the voltage moving average value for the most recent past one minute), every time the voltage measurement value is acquired (for example, in a cycle of one second), and stores the voltage moving average value for a predetermined period of time (for example, for one minute) (S2). For example, in the cooperative voltage sensor (CVS) 8, the target-voltage change-request information generating unit 42a calculates the voltage moving average value 43b, and stores the voltage moving average value 43b in the storage unit 43 for a predetermined period of time. For example, in the cooperative voltage controller (CVC) 12, the target-voltage change-request information generating unit 61a calculates the voltage moving average value 63b, and stores the voltage moving average value 63b in the storage unit 63 for a predetermined period of time.

The cooperative voltage sensor (CVS) or the reactive-power-adjusting-type cooperative voltage controller (CVC) holds the appropriate-voltage upper/lower limits (the appropriate voltage upper limit and the appropriate voltage lower limit), to compare, for example, the calculated latest voltage moving average value with the appropriate-voltage upper/lower limits for each preset cycle (for example, in a cycle of one minute) (S3). If the voltage moving average value deviates from the range of the appropriate-voltage upper/lower limits (NO at S4), the cooperative voltage sensor (CVS) or the reactive-power-adjusting-type cooperative voltage controller (CVC) issues a target-voltage-value change request (S5). For example, in the cooperative voltage sensor (CVS) 8, the target-voltage-range change request information generating unit 42a performs the comparison process described above, and if the voltage moving average value 43b is not within the range of the appropriate-voltage upper/lower limits 43a, generates the target-voltage-range change request information. For example, in the cooperative voltage controller (CVC) 12, the target-voltage-range change request information generating unit 61a performs the comparison process described above, and if the voltage moving average value 63b is not within the range of the appropriate-voltage upper/lower limits 63a, generates the target-voltage-range change request information. The target-voltage-range change request information includes information of a voltage change amount and a voltage change direction (a voltage increasing direction or a voltage decreasing direction). For example, if the voltage moving average value deviates from the appropriate voltage upper limit, the voltage change direction is a direction of decreasing the voltage. It is reasonable that the voltage change amount is provided in a percentage normalized by the reference voltage, taking into consideration communication between devices having a different voltage level, and for example, about "deviation amount %+0.5%" is set. In this case, the voltage change amount is substantially set as the ratio of the deviation amount to the latest voltage moving average value. The reason the voltage moving average value is used is for, for example, determining a deviation of the voltage measurement value is to avoid that an unnecessary target-voltage-range change request is issued, when the voltage temporarily deviates from the appropriate voltage range due to a whisker-like voltage change within a matter of seconds. In the case where the voltage moving average value is within the range of the appropriate voltage upper/lower limits (YES at S4), the control process returns to S1.

An operation of the cooperative voltage controller (CVC) having received a target-voltage change request is described next. The cooperative voltage controller (CVC) itself having issued a target-voltage change request performs a similar operation as that of the cooperative voltage controller (CVC) having received the target-voltage change request. Because an operation when the cooperative voltage controller (CVC) 1B of the power distribution transformer 1 receives the target-voltage-range change request is partly different, the operation thereof will be described separately.

A common operation to the reactive-power-adjusting-type and the transformer-type cooperative voltage controllers (CVC) is described first. FIG. 7 is a flowchart illustrating a process of changing target-voltage upper/lower limits of the cooperative voltage controller (CVC) having received the target-voltage-range change request.

The cooperative voltage controller (CVC) first receives target-voltage change-request information from the cooperative voltage sensor (CVS) or another cooperative voltage controller (CVC) (S10).

The cooperative voltage controller (CVC), for example, discriminates whether the contents of the target-voltage change-request information indicates to decrease the voltage or increase the voltage (S11). For example, upon reception of a request to decrease the voltage (YES at S11), the cooperative voltage controller (CVC) selects the largest voltage moving average value from a plurality of voltage moving average values stored at that point in time, including the latest voltage moving average value, and sets a value obtained by subtracting a voltage change amount therefrom as a new target-voltage upper limit (S12). At this time, for example, in order to maintain a constant range in the target-voltage upper/lower limits, the target-voltage lower limit is set to a value obtained by subtracting the dead zone from the target-voltage upper limit (S12). However, if the target-voltage lower limit set in this manner falls below the appropriate voltage lower limit of the cooperative voltage controller (CVC) (NO at S13), the cooperative voltage controller (CVC) does not set the target-voltage upper/lower limits, discards the request, and does not relay the request (S15). If the target-voltage lower limit set in this manner is equal to or higher than the appropriate voltage lower limit (YES at S13), the cooperative voltage controller (CVC) sets the target-voltage upper/lower limits (S14).

Upon reception of a request to increase the voltage (NO at S11), the cooperative voltage controller (CVC), for example, selects the smallest voltage moving average value from a plurality of voltage moving average values stored at that point in time, including the latest voltage moving average value, and sets a value obtained by adding a voltage change amount thereto as a new target-voltage lower limit (S16). At this time, for example, in order to maintain a constant range in the target-voltage upper/lower limits, the target-voltage upper limit is set to a value obtained by adding the dead zone to the target-voltage lower limit (S16). However, if the target-voltage upper limit set in this manner exceeds the appropriate voltage upper limit of the cooperative voltage controller (CVC) (NO at S17), the cooperative voltage controller (CVC) does not set the target-voltage upper/lower limits, discards the request, and does not relay the request (S15). That is, the target-voltage upper/lower limits after the change need to be within the appropriate voltage range. If the target-voltage upper limit set in this manner falls below the appropriate voltage upper limit (YES at S17), the cooperative voltage controller (CVC) sets the target-voltage upper/lower limits (S14).

The cooperative voltage controller (CVC) having received the target-voltage change request changes the target-voltage upper/lower limits, and fixes the target-voltage upper/lower limits within a preset voltage cooperative-control valid time (for example, one hour), but after the voltage cooperative-control valid time has passed, returns the target-voltage upper/lower limits to the initial values.

If a new target-voltage change request is issued, the cooperative voltage controller (CVC) changes the target-voltage upper/lower limits with a later priority even within the voltage cooperative-control valid time, and further counts the voltage cooperative-control valid time from the time point of change. However, to avoid congestion of the voltage cooperative operation, an overlapped operation prohibition time is set for each device that executes the voltage cooperative control. That is, the cooperative voltage sensor (CVS) does not issue (transmit) a new target-voltage-range change request until the overlapped operation prohibition time (for example, 10 seconds) has passed after issuance of the target-voltage change request. The reactive-power-adjusting-type cooperative voltage controller (CVC) does not issue (transmit) a new target-voltage-range change request until the overlapped operation prohibition time (for example, 1 minute) has passed after issuance (transmission) of the target-voltage-range change request. The reactive-power-adjusting-type cooperative voltage controller (CVC) does not receive a new target-voltage-range change request until the overlapped operation prohibition time (for example, 1 minute) has passed after reception of the target-voltage-range change request. The transformer-type cooperative voltage controller (CVC) does not receive a new target-voltage change request until the overlapped operation prohibition time (for example, 30 minutes) has passed after reception of the target-voltage-range change request. Note that the overlapped operation prohibition time is shorter than the voltage cooperative-control valid time. The transformer-type cooperative voltage controller (CVC) does not issue (transmit) a new target-voltage-range change request until the overlapped operation prohibition time (for example, 30 minutes) has passed after issuance (transmission) of the target-voltage-range change request. The transformer-type cooperative voltage controller (CVC) does not receive a new target-voltage range change request until the overlapped operation prohibition time (for example, 30 minutes) has passed after reception of the target-voltage-range change request. Note that the overlapped operation prohibition time is shorter than the voltage cooperative-control valid time.

Figure 8:
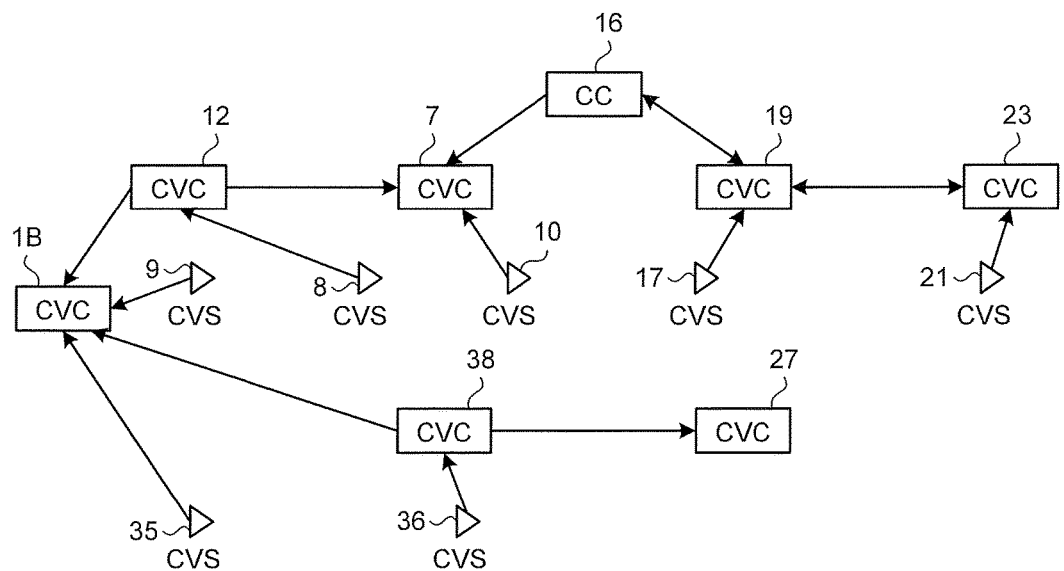
FIG. 8 is a diagram illustrating an example of a communication path (a logical network) between cooperative voltage sensors (CVS) and cooperative voltage controllers (CVC).

Transmission of the target-voltage-range change request information is described next. The target-voltage-range change request information is transmitted, for example, between devices by a relay method. FIG. 8 is a diagram illustrating an example of a communication path (a logical network) between the cooperative voltage sensor (CVS) and the cooperative voltage controller (CVC). In FIG. 8, arrows represent a transmittable direction of target-voltage-range change request information. A range that the target-voltage-range change request information is transmitted is set so as not exceed the transformer-type cooperative voltage controllers (CVC). As can be understood from a comparison between FIG. 8 and FIG. 1, this logical network has a network configuration corresponding to an electrical connection configuration of a cooperative voltage sensor (CVS) group, a cooperative voltage controller (CVC) group, the connection controller (CC) 16, and a power distribution line group in the power distribution system illustrated in FIG. 1. That is, the arrangement configuration of the cooperative voltage sensor (CVS) group, the cooperative voltage controller (CVC) group, and the connection controller (CC) 16 corresponds to the connection relation among these in the power distribution system.

The cooperative voltage sensor (CVS) does not receive target-voltage-range change request information from other devices, and when the cooperative voltage sensor (CVS) itself has issued a target-voltage change request, the cooperative voltage sensor (CVS) transmits the target-voltage-range change request information to predetermined one or a plurality of cooperative voltage controllers (CVC). For example, the cooperative voltage sensor (CVS) 21 transmits the target-voltage-range change request information to the cooperative voltage controller (CVC) 23. For example, the cooperative voltage sensor (CVS) 36 transmits the target-voltage-range change request information to the cooperative voltage controller (CVC) 38.

When having received target-voltage change-request information from other devices, the cooperative voltage controller (CVC) can transmit the target-voltage change-request information to predetermined one or a plurality of other cooperative voltage controllers (CVC). However, the cooperative voltage controller (CVC) does not transmit the target-voltage change-request information to the transmission source. For example, when having received target-voltage change-request information from the cooperative voltage sensor (CVS) 21, the cooperative voltage controller (CVC) 23 transmits the target-voltage change-request information to the cooperative voltage controller (CVC) 19.

When the cooperative voltage controller (CVC) itself has issued a target-voltage change request, the cooperative voltage controller (CVC) transmits the target-voltage change-request information to predetermined one or a plurality of other cooperative voltage controllers (CVC). For example, when the cooperative voltage controller (CVC) 19 itself has issued a target-voltage change request, the cooperative voltage controller (CVC) 19 transmits the target-voltage change-request information to the cooperative voltage controller (CVC) 23 and also to the cooperative voltage controller (CVC) 7 via the connection controller (CC) 16. For example, when the cooperative voltage controller (CVC) 38 itself has issued a target-voltage-range change request, the cooperative voltage controller (CVC) 38 transmits the target-voltage-range change request information to the cooperative voltage controller (CVC) 27 and the cooperative voltage controller (CVC) 1B.

Figure 9:
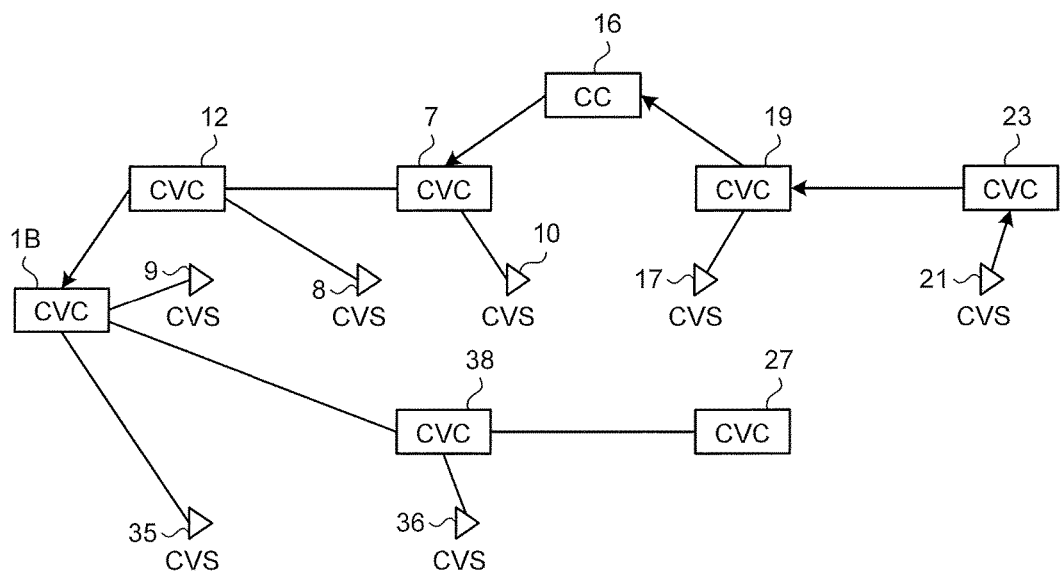
FIG. 9 is a diagram illustrating an example of communication by a relay method between cooperative voltage sensors (CVS) and cooperative voltage controllers (CVC).

FIG. 9 is a diagram illustrating an example of communication by a relay method between the cooperative voltage sensor (CVS) and the cooperative voltage controller (CVC). In FIG. 9, for example, a case in which the cooperative voltage sensor (CVS) 21 has issued a target-voltage-range change request. The cooperative voltage sensor (CVS) 21 generates target-voltage change-request information, and transmits the target-voltage change-request information to the cooperative voltage controller (CVC) 23. The cooperative voltage controller (CVC) 23 transmits the received target-voltage-range change request information to the cooperative voltage controller (CVC) 19. The cooperative voltage controller (CVC) 19 transmits the received target-voltage-range change request information to the connection controller (CC) 16. The connection controller (CC) 16 transmits the received target-voltage-range change request information to the cooperative voltage controller (CVC) 7. That is, the cooperative voltage controller (CVC) 19 transmits the received target-voltage-range change request information to the cooperative voltage controller (CVC) 7 via the connection controller (CC) 16. Further, the cooperative voltage controller (CVC) 7 does not relay the received target-voltage-range change request information.

The cooperative voltage sensor (CVS), the cooperative voltage controller (CVC), and the connection controller (CC) 16 respectively hold a destination network address of the target-voltage-range change request. Setting of the network address is performed such that the relaying and transmitting range of the target-voltage-range change request is within the range to the transformer-type cooperative voltage controller (CVC). For example, the cooperative voltage sensor (CVS) 21 holds a network address of the cooperative voltage controller (CVC) 23 as a destination. For example, the cooperative voltage controller (CVC) 19 holds respective network addresses of the cooperative voltage controller (CVC) 23 and the connection controller (CC) 16 as destinations. When issuing a target-voltage-range change request by itself or having received a target-voltage-range change request from the cooperative voltage sensor (CVS) 17, the cooperative voltage controller (CVC) 19 sends the target-voltage-range change request by setting the network addresses of the cooperative voltage controller (CVC) 23 and the connection controller (CC) 16 as the destinations. When having received a target-voltage-range change request from the cooperative voltage controller (CVC) 23 or the connection controller (CC) 16, the cooperative voltage controller (CVC) 19 sends the target-voltage-range change request by setting the network address of a control device other than the source of the received target-voltage-range change request as the destination.

As illustrated in FIG. 8, the logical network is configured on the basis of electrical connection, that is, for one power distribution line directly associated with voltage fluctuations. However, if the electrical connection may be changed due to a change of the switching state of a switch or a breaker, the connection controller (CC) 16 is installed in order to reflect the electrical connection change in the range of relaying and transmitting a target-voltage-range change request. When the switch or the breaker is closed, the connection controller (CC) 16 relays the target-voltage-range change request. When the switch or the breaker is open, the connection controller (CC) 16 discards the target-voltage-range change request. For example, in FIG. 1, a system portion on the load side further than the switch 15 on the power distribution line 2-1 may be connected to a system portion on the power distribution line 2-2 by opening the switch 15 on the power distribution line 2-1. In such a case, by reflecting a change of the electrical connection in the downstream range on the communication path by the connection controller (CC) 16, the connection of the power distribution system is appropriately reflected on the relay range of the target-voltage-range change request, and thus voltage cooperative control becomes effective.

In FIG. 8, an arrow directed from the cooperative voltage controllers (CVC) 1B, 7, and 27 to the other cooperative voltage controllers (CVC) is not illustrated. This means that the transformer-type cooperative voltage controller (CVC) itself does not issue a target-voltage-range change request, as described above, and even if having received target-voltage-range change request information from the cooperative voltage sensor (CVS), the transformer-type cooperative voltage controller (CVC) does not relay the target-voltage-range change request information to other cooperative voltage controllers (CVC).

An operation when the cooperative voltage controller (CVC) 1B of the power distribution transformer 1 has received a target-voltage-range change request is described next.

When having received a target-voltage-range change request issued by another cooperative voltage controller (CVC) or cooperative voltage sensor (CVS), the cooperative voltage controller (CVC) 1B first determines whether to change the target voltage range according to request contents. This is due to the following reasons.

As illustrated in FIG. 1, the bus 29 is connected to the secondary side of the power distribution transformer 1 and the power distribution lines 2-1 and 2-2 are connected to the bus 29. The power generation sources (PV) are connected to the power distribution line 2-1, but there is no power generation source (PV) connected to the power distribution line 2-2. Therefore, for example, in the power distribution line 2-1, a terminal voltage may rise due to the power generation source (PV), and a terminal voltage may drop in the power distribution line 2-2 because only loads are connected thereto. As an example, in the case where the cooperative voltage sensor (CVS) 8 on the power distribution line 2-1 detects a deviation from the voltage upper limit and transmits a voltage decrease request (a target-voltage-range change request) to decrease the target voltage range, such a hunting phenomenon may occur in which the cooperative voltage controller (CVC) 1B having received the request performs a tap operation by decreasing the target voltage upper/lower limits as requested, and then, a cooperative voltage sensor (CVS) 36 on the side of the power distribution line 2-2 detects a deviation from the voltage lower limit, and transmits a voltage increase request. In this manner, if the voltage is changed immediately according to a target-voltage-range change request received from a system of a certain power distribution line, the operation becomes unstable and the number of tap operations unnecessarily increases, which is a problem. Therefore, upon reception of a target-voltage-range change request, the cooperative voltage controller (CVC) 1B checks whether or not a hunting phenomenon in which immediately after the target voltage range is changed, the target voltage is repeatedly changed to an opposite direction occurs, and when it can be confirmed that a voltage change does not involve any problem, the cooperative voltage controller (CVC) 1B changes the target voltage range.

Figure 10:
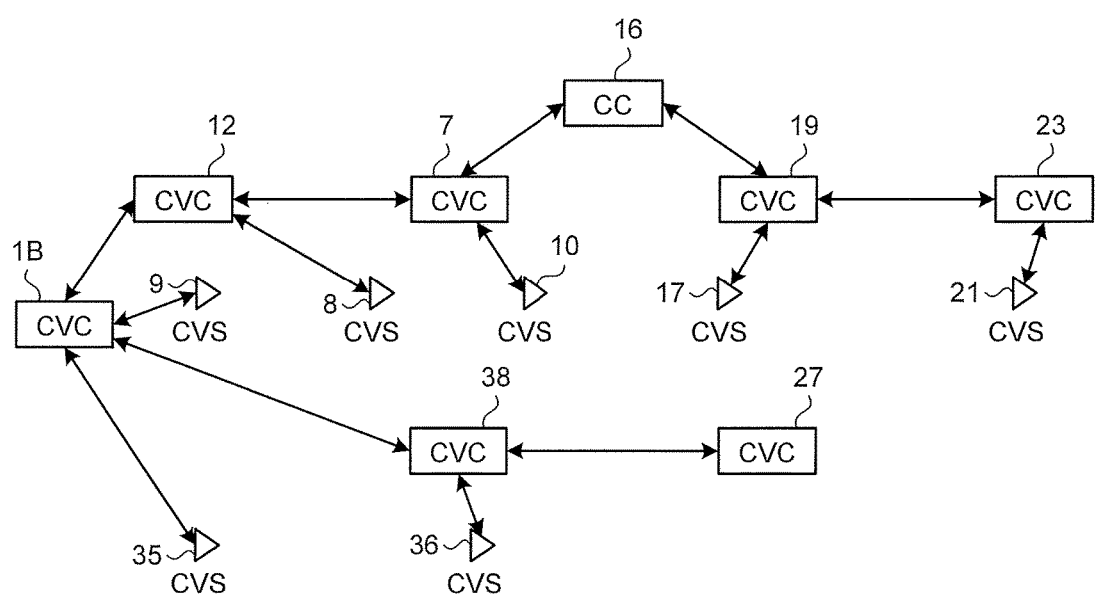
FIG. 10 is a diagram illustrating an example of a path, through which an inquiry and a response are communicated by a relay method between cooperative voltage sensors (CVS) and cooperative voltage controllers (CVC).

Specifically, upon reception of a target-voltage-range change request, the cooperative voltage controller (CVC) 1B makes a change-possibility confirmation inquiry about whether there is no problem even if the target voltage range is changed to the cooperative voltage sensor (CVS) and the cooperative voltage controller (CVC) connected to another power distribution line different from the power distribution line, to which the device having transmitted the request is connected. If a response result thereof indicates acceptance, the cooperative voltage controller (CVC) 1B changes the target voltage range, and if the response result thereof indicates non-acceptance, the cooperative voltage controller (CVC) 1B does not change the target voltage range. For example, when having received a target-voltage-range change request requesting to decrease the target voltage range from the cooperative voltage controller (CVC) connected to the power distribution line 2-1, the cooperative voltage controller (CVC) 1B transmits an inquiry about whether there is no problem even if the target voltage range is decreased to the cooperative voltage controllers (CVC) 27 and 38 and the cooperative voltage sensors (CVS) 35 and 36 connected to the power distribution line 2-2, together with a change amount of the target voltage. Thereafter, if a negation response (a response indicating that the change of the target voltage is unacceptable) is not received within a preset period of time (for example, within 60 seconds), the cooperative voltage controller (CVC) 1B changes the target voltage range. An inquiry from the cooperative voltage controller (CVC) 1B to those devices and a response therefrom are relayed in the same manner as the target-voltagerange change request. FIG. 10 is a diagram illustrating an example of a path, through which an inquiry and a response are transmitted by a relay method between the cooperative voltage sensors (CVS) and the cooperative voltage controllers (CVC). In FIG. 10, the arrows represent a direction allowable for transmission of an inquiry and a response. The inquiry is relayed in a direction from the upstream (the CVC 1B) to other devices (the CVS, the CVC), and the response is relayed in the opposite direction (a direction toward the CVC 1B). The transformer-type cooperative voltage controllers (CVC) also relay the inquiry and the response regarding the change-possibility confirmation. The transformer-type cooperative voltage controllers (CVC) can determine as to whether the voltage-control responsibility range is not affected by the change of the target voltage range by the cooperative voltage controller (CVC) 1B, and if the voltage-control responsibility range is not affected, the transformer-type cooperative voltage controllers (CVC) may not relay the inquiry and the response regarding the change-possibility confirmation.

Figure 11:
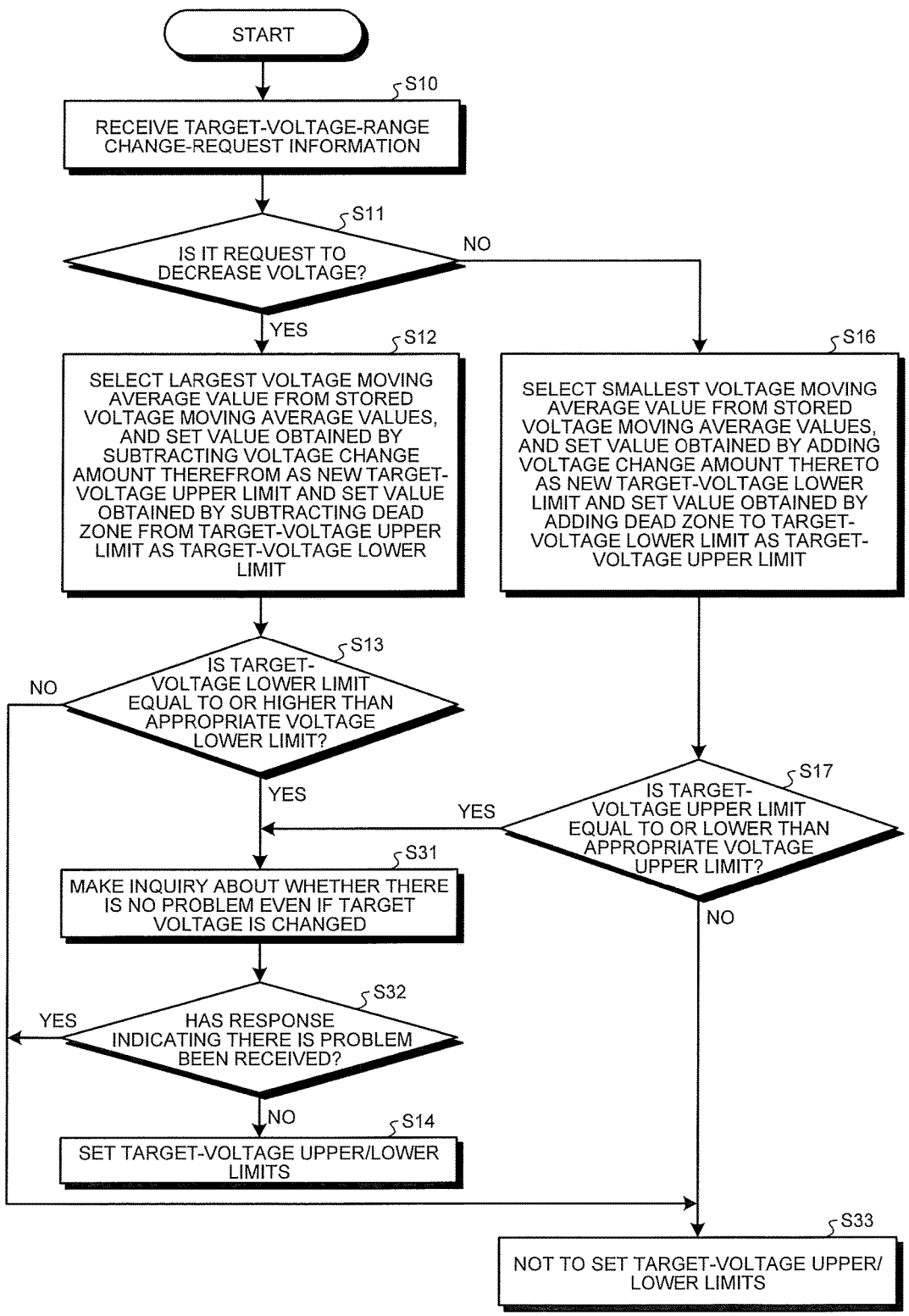
FIG. 11 is a flowchart illustrating a process of changing a target voltage range of the cooperative voltage controller (CVC) 1B having received a target-voltage-range change request.

The operation of the cooperative voltage controller (CVC) 1B when having received a target-voltage-range change request is described in detail with reference to FIG. 11. FIG. 11 is a flowchart illustrating a process of changing target voltage upper/lower limits of the cooperative voltage controller (CVC) 1B having received a target-voltage-range change request. As can be understood from a comparison between the flowchart (FIG. 7) illustrating the operation when a cooperative voltage controller (CVC) other than the cooperative voltage controller (CVC) 1B has received a target-voltage-range change request and FIG. 11, in the flowchart illustrated in FIG. 11, Steps S31 and S32 are added to the flowchart illustrated in FIG. 7, and Step S15 is replaced by Step S33. Steps other than the Steps S31 to S33 are common with the flowchart illustrated in FIG. 7, and thus descriptions of the common part are omitted.

When the cooperative voltage controller (CVC) 1B performs Step S13 or S17 and determines that setting (change) of target voltage upper/lower limits is possible (YES at S13 or YES at S17), the cooperative voltage controller (CVC) 1B makes an inquiry about whether there is no problem even if the target voltage range is changed to all the cooperative voltage sensors (CVS) and the cooperative voltage controllers (CVC) connected to a power distribution line other than the power distribution line connected with a source device of the target-voltage-range change request (S31). For example, when having received a target-voltage-range change request from the cooperative voltage controller (CVC) 12, the cooperative voltage controller (CVC) 1B makes an inquiry about whether there is no problem even if the target voltage range is changed to the cooperative voltage sensors (CVS) 35 and 36 and the cooperative voltage controllers (CVC) 27 and 38. At the time of inquiry, the change contents are notified. For example, the target voltage upper/lower limits determined at Step S12 or S16, that is, the target voltage upper/lower limits scheduled to be reset can be notified, or more simply, the direction of changing (increasing or decreasing) the target voltage upper/lower limits can be notified. Thereafter, if a response indicating non-acceptance of the change (a response indicating there is a problem) is received within a preset period of time (for example, 60 seconds) (YES at S32), the cooperative voltage controller (CVC) 1B does not set the target voltage upper/lower limits (S33). On the other hand, if a response indicating non-acceptance of the change is not received (NO at S32), the cooperative voltage controller (CVC) 1B sets the target voltage upper/lower limits (S14). The processes at Steps S31 and S32 are performed, for example, by the target-voltage-range change request processing unit 51d. A determination regarding whether to perform setting (change) of the target voltage upper/lower limits is made, for example, by the target-voltage-range change processing unit 51b.

According to the configuration in which it is determined whether to change the target voltage upper/lower limits according to whether a response indicating non-acceptance of the change has been received within a preset period of time and the configuration of relaying the inquiry, the cooperative voltage controller (CVC) 1B can reduce the information to be held. That is, the cooperative voltage controller (CVC) 1B needs only to hold information of the device to be a direct communication partner (in the case of FIG. 1, the cooperative voltage controllers (CVC) 7 and 27), and information on other devices (the CVS, the CVC) in the power-distribution-system voltage control system does not need to be held.

The operations of the cooperative voltage sensor (CVS) and the cooperative voltage controller (CVC), upon reception of an inquiry about whether there is no problem even if the target voltage upper/lower limits are changed from the cooperative voltage controller (CVC) 1B are described.

Figure 12:
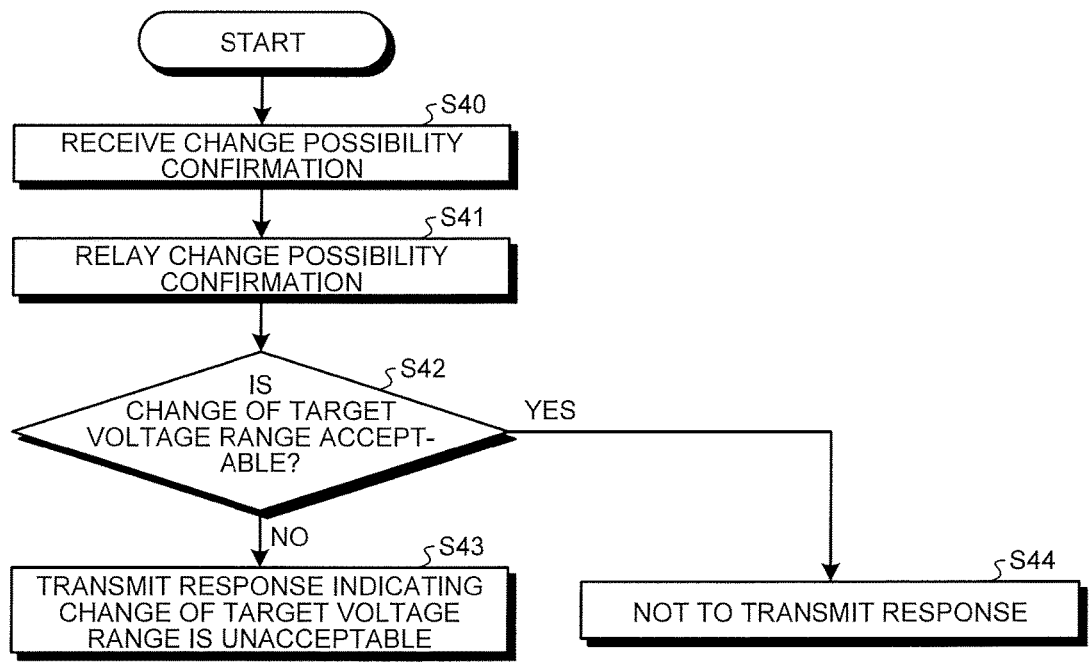
FIG. 12 is a flowchart illustrating an operation example of a cooperative voltage sensor (CVS) and a cooperative voltage controller (CVC), upon reception of an inquiry about whether there is no problem even if a target voltage range is changed.

FIG. 12 is a flowchart illustrating an operation example of a cooperative voltage sensor (CVS) and a cooperative voltage controller (CVC), upon reception of an inquiry about whether there is no problem even if the target voltage range is changed. These operations are mainly performed by the change-acceptance determining units 42b, 61c, and 51c.

The cooperative voltage sensor (CVS) and the cooperative voltage controller (CVC) first receive a change-possibility confirmation as an inquiry about whether there is no problem even if the target voltage range is changed (S40).

The cooperative voltage controller (CVC) having received the change-possibility confirmation relays the change-possibility confirmation according to need (S41). For example, upon reception of a change-possibility confirmation from the cooperative voltage controller (CVC) 1B on the upstream side, the cooperative voltage controller (CVC) 12 transfers the change-possibility confirmation to the devices (the CVS 8 and the CVC 7) other than the transmission source device (the CVC 1B) (see FIG. 10). Because a partner with which the cooperative voltage sensor (CVS) can communicate is one cooperative voltage controller (CVC), the cooperative voltage sensor (CVS) does not perform Step S41.

The cooperative voltage sensor (CVS) and the cooperative voltage controller (CVC) determine as to whether execution of the operation according to the change-possibility confirmation (a change of the target voltage range) is acceptable (Step S42). For example, each of the cooperative voltage sensor (CVS) and the cooperative voltage controller (CVC) predict a monitored voltage, which is a voltage at a monitoring site (its own terminal) after the operation indicated by the change-possibility confirmation (increasing or decreasing the target voltage range as a whole) has been performed. If there is a high possibility that the predicted monitored voltage at its own terminal (for example, a voltage moving average value) deviates from the range of the appropriate voltage upper/lower limits, that is, if there is a high possibility that its own device issues a target-voltage-range change request (a change request in an opposite direction) by the fact that the target voltage range is changed by the cooperative voltage controller (CVC) 1B, the cooperative voltage sensor (CVS) and the cooperative voltage controller (CVC) determine that the change is unacceptable.

In the case that the change is unacceptable (NO at S42), the cooperative voltage sensor (CVS) and the cooperative voltage controller (CVC) transmit a response indicating that the change of the target voltage range is unacceptable (S43). On the other hand, if the change of the target voltage range is acceptable (YES at S42), the cooperative voltage sensor (CVS) and the cooperative voltage controller (CVC) do not transmit any response (S44).

In this manner, according to the configuration in which a response is transmitted only when a change of the target voltage range is unacceptable, the processing load on the cooperative voltage sensor (CVS) and the cooperative voltage controller (CVC) can be reduced. Further, unnecessary increase in the network traffic can be avoided, and when the system is expanded, an increase of the probability that congestion occurs in the network can be suppressed.

As described above, when having received a response indicating that a change of the target voltage range is unacceptable from one or more devices within a preset period of time after making the inquiry (transmission of the change-possibility confirmation), the cooperative voltage controller (CVC) 1B does not change the target voltage range. Therefore, the relay of the change-possibility confirmation to be performed at Step S41 described above can be performed after it is determined that the change of the target voltage range is acceptable at Step S42. If the own device transmits a response indicating non-acceptance of the change, the cooperative voltage controller (CVC) 1B having received this response determines not to change the target voltage range. Therefore, it is not necessary to determine whether the change of the target voltage range is acceptable in other devices (the CVS, the CVC). When the configuration is such that the change-possibility confirmation is relayed only when it is determined that the change of the target voltage range is acceptable, the processing load on the cooperative voltage controller (CVC) can be further reduced, and the probability that congestion occurs in the network can be further decreased.

As described above, according to the present embodiment, a transformer-type cooperative voltage controller (CVC), reactive-power-adjusting-type cooperative voltage controllers (CVC), cooperative voltage sensors (CVS) and a transformer-type cooperative voltage controller (CVC) connected to the same power distribution line are communicably connected, and when a target-voltage-range change request is issued in either of the reactive-power-adjusting-type cooperative voltage controllers (CVC) and the cooperative voltage sensors (CVS) connected to the same power distribution line, the target-voltage-range change request is delivered to all the transformer-type cooperative voltage controller (CVC) and the reactive-power-adjusting-type cooperative voltage controllers (CVC) by communication, and all the cooperative voltage controllers (CVC) having received the target-voltage-range change request cooperate to execute voltage control. Accordingly, cooperative voltage control can be realized among the plurality of cooperative voltage controllers (CVC), without using a central apparatus (a centralized voltage controller) as in the conventional technique.

Furthermore, upon reception of a target-voltage-range change request, the transformer-type cooperative voltage controller (CVC) installed in the power distribution transformer makes an inquiry about whether there is no problem even if the target voltage range is changed according to the change request to the cooperative voltage controllers (CVC) and the cooperative voltage sensor (CVS), which are connected to a distribution line different from a distribution line connected with a request source device and monitor the voltage. If there is no problem, the transformer-type cooperative voltage controller (CVC) installed in the power distribution transformer changes the target voltage range. Therefore, the transformer-type cooperative voltage controller (CVC) can prevent occurrence of a hunting phenomenon in which a change request requesting an increase of the target voltage and a change request requesting a decrease of the target voltage are issued frequently, and can realize stable control.

Second Embodiment

In a second embodiment of the present invention, a modification of the cooperative voltage controller (CVC) installed in the power distribution transformer is descried. The configuration of the power-distribution-system voltage control system is identical to that of the first embodiment.

In the first embodiment, upon reception of a target-voltage-range change request, the cooperative voltage controller (CVC) 1B makes an inquiry about whether a change of the target voltage range is acceptable to the cooperative voltage sensors (CVS) and the cooperative voltage controllers (CVC), which are connected to a distribution line different from the distribution line connected with the request source device, and when all the devices determine that the change is acceptable (when there is no device that transmits a response indicating non-acceptance within a preset period of time), the target voltage range is changed. Further, the cooperative voltage sensors (CVS) and the cooperative voltage controllers (CVC) having received the inquiry transmit a response only when the change is unacceptable. However, this operation can be changed as described below.

(First Modification)

The cooperative voltage sensors (CVS) and the cooperative voltage controllers (CVC) having received an inquiry about whether a change of the target voltage range is acceptable from the cooperative voltage controller (CVC) 1B respectively transmit a response indicating acceptance of the change, even when the change is acceptable, and the cooperative voltage controller (CVC) 1B changes the target voltage range when all the responses received within a preset period of time indicate that the change is acceptable. Due to this configuration, control reliability can be increased. It can also be arranged such that a voltage-monitoring-device managing unit that manages the voltage monitoring devices that transmit a change-possibility confirmation is provided, and at a point in time when a response indicating acceptance of the change is received from all the voltage monitoring devices to which the change-possibility confirmation has been transmitted, it can be determined to change the target voltage range.

(Second Modification)

The cooperative voltage sensor (CVS) and the cooperative voltage controller (CVC) that are voltage monitoring devices and have received an inquiry about whether a change of the target voltage range is acceptable from the cooperative voltage controller (CVC) 1B respectively transmit a response indicating acceptance of the change, even when the change is acceptable, and the cooperative voltage controller (CVC) 1B changes the target voltage range when the responses indicating acceptance of the change, among the responses received within a preset period of time, exceed a certain ratio (for example, 90%). Further, the cooperative voltage controller (CVC) 1B notifies the respective devices, to which an inquiry about whether the change of the target voltage range is acceptable has been made, of a change execution result indicating whether the change has been made. A device that has sent a response indicating non-acceptance of the change, among the devices having received the change execution result, does not issue a target-voltage-range change request until a certain period of time (for example, one hour) has passed. Due to this configuration, more flexible control can be realized. Further, after the change is performed, the device that has sent the response indicating non-acceptance of the change does not issue a target-voltage-range change request in an opposite direction until a preset period of time has passed, and thus occurrence of a hunting phenomenon can be suppressed. As an acceptance determination returned by the voltage monitoring devices, "not desirable but acceptable" can be returned in addition to "acceptable" and "unacceptable". Only when a voltage monitoring device that has returned an acceptance determination of "not desirable but acceptable" is present, the change execution result can be transmitted.

(Third Modification)

The cooperative voltage sensor (CVS) and the cooperative voltage controller (CVC) having received the inquiry about whether a change of the target voltage range is acceptable from the cooperative voltage controller (CVC) 1B respectively transmit a response indicating acceptance of the change, even when the change is acceptable, and the cooperative voltage controller (CVC) 1B changes the target voltage range when the responses indicating acceptance of the change, among the responses received within a preset period of time, exceed a certain ratio (for example, 90%). Further, the cooperative voltage controller (CVC) 1B notifies the respective devices, to which an inquiry about whether the change of the target voltage range is acceptable has been made, of the execution of the change. A device that has sent a response indicating non-acceptance of the change, among the devices having received the notification, enlarges the voltage appropriate range (the appropriate voltage upper/lower limits) than the normal upper/lower limits over a preset period of time (for example, one hour). That is, the device sets the appropriate voltage upper limit to a larger value than before and the appropriate voltage lower limit to a smaller value than before. Due to this configuration, more flexible control can be realized. Further, after the change is performed, the device that has sent a response indicating non-acceptance of the change can suppress occurrence of a hunting phenomenon, because the probability of issuing the target-voltage-range change request decreases until the preset period of time has passed. At the time of enlarging the voltage appropriate range, only one of the upper limit and the lower limit can be changed. For example, in a case in which upon reception of an inquiry about whether a change to decrease the target voltage range can be performed, if the change is performed (when execution of the change is notified) even if a response indicating non-acceptance of the change is returned, the cooperative voltage sensor (CVS) changes only the appropriate voltage lower limit to a lower value than before over a certain period of time.

(Fourth Modification)

The second and third modifications described above can be changed in the following manner. The cooperative voltage sensors (CVS) and the cooperative voltage controllers (CVC) having received an inquiry about whether a change of the target voltage range is acceptable from the cooperative voltage controller (CVC) 1B respectively transmit a response indicating "not desirable but acceptable" as an acceptance determination, if there is a high possibility that the voltage at the own terminal deviates from the range of the appropriate voltage upper/lower limits due to the execution of the change but there is a low possibility that the voltage at the own terminal deviates from a legal voltage range (in the case of Japan, for example, a range from 95 volts to 107 volts) (a first case). If there is a high possibility that the voltage at the own terminal deviates from the legal voltage range (a second case), the cooperative voltage sensors (CVS) and the cooperative voltage controllers (CVC) respectively transmit a response indicating "unacceptable". If having received at least one response "unacceptable", the cooperative voltage controller (CVC) 1B does not change the target voltage range. On the other hand, if there is no response indicating "unacceptable", as described above, when the responses indicating acceptance of the responses received within a preset period of time, exceed a certain ratio (for example 90%), the cooperative voltage controller (CVC) 1B changes the target voltage range. Due to this configuration, flexible control and avoidance of a hunting phenomenon can be realized, and a highly reliable power-distribution-system voltage control system that does not deviate from a legal voltage range can be realized.

INDUSTRIAL APPLICABILITY

As described above, the present invention is useful in realizing a power-distribution-system voltage control system that does not require a centralized voltage controller.

REFERENCE SIGNS LIST 1 power distribution transformer, 1A LRT (on-load tap-changing transformer), 1B cooperative voltage controller (CVC), 2-1, 2-2, 32-34 power distribution line, 3-1, 3-2 breaker, 4, 14, 24 transformer, 5 load, 6, 26 SVR, 7, 12, 19, 23, 27, 38 cooperative voltage controller (CVC), 8, 9, 10, 17, 21, 35, 36 cooperative voltage sensor (CVS), 11, 18 power conditioner (PCS), 15 switch, 16 connection controller (CC), 22, 37 static var compensator (SVC), 29 bus, 30 communication network, 31 network cable, 40 voltage measuring unit, 41, 50, 60 voltage monitoring unit, 42, 61 arithmetic processing unit, 42a target-voltage-range change request information generating unit, 42b, 51c, 61c change-acceptance determining unit, 43, 53, 63 storage unit, 43a, 53a, 63a appropriate-voltage upper/lower limits, 43b, 53b, 63b voltage moving average value, 44, 54, 64 communication processing unit, 51 arithmetic processing unit, 51b, 61b target-voltage-range change processing unit, 51d target-voltage-range change request processing unit, 52 voltage adjusting unit, 53c, 63c target-voltage upper/lower limits, 43c, 53d, 63d voltage measurement value, 61d reactive-power integration value calculating unit, 62 voltage adjusting unit.

The invention claimed is:

1. A voltage controller comprising:
a voltage adjusting unit to control a first voltage controller that changes a voltage of a bus, to which a plurality of power distribution lines are connected, such that the voltage of the bus is within a target voltage range;
a communication processing unit to communicate with a voltage monitoring device, the voltage monitoring device being a second voltage controller that controls a voltage control device connected to each of the power distribution lines or a voltage sensor that is installed on each of the power distribution lines to measure a voltage at its installation site;
a target-voltage-range change request processing unit to transmit, when having received a change request of the target voltage range from the voltage monitoring device connected to one of the plurality of power distribution lines, a change-possibility confirmation for inquiring about whether the target voltage range can be changed to the voltage monitoring device connected to another power distribution line different from the one power distribution line, to which the voltage monitoring device having transmitted the change request is connected, via the communication processing unit, and to determine whether to change the target voltage range according to a response to the change-possibility confirmation from the voltage monitoring device connected to the other power distribution line; and a target-voltage-range change processing unit that changes the target voltage range when the target-voltage-range change request processing unit determines to change the target voltage range.

2. The voltage controller according to claim 1, wherein the target-voltage-range change request processing unit determines not to change the target voltage range, at a point in time when a response indicating non-acceptance of a change is received.

3. The voltage controller according to claim 1, wherein the target-voltage-range change request processing unit determines to change the target voltage range, when a preset period of time has passed after transmission of the change-possibility confirmation, without receiving a response indicating non-acceptance of a change.

4. The voltage controller according to claim 1, wherein the target-voltage-range change request processing unit determines to change the target voltage range, when a number of responses indicating acceptance of a change, among responses received until a preset period of time has passed after transmission of the change-possibility confirmation, exceeds a certain ratio to all the responses received.

5. The voltage controller according to claim 1, comprising a voltage-monitoring-device managing unit to manage the voltage monitoring device that transmits the change-possibility confirmation, wherein the target-voltage-range change request processing unit determines to change the target voltage range, at a point in time when a response indicating acceptance of a change is received from all the voltage monitoring devices, to which the change-possibility confirmation has been transmitted.

6. The voltage controller according to claim 1, comprising a change-execution-result notifying unit to transmit a change execution result indicating as to whether or not a target voltage range has been changed via the communication processing unit.

7. The voltage controller according to claim 6, wherein the voltage monitoring device having received the change-possibility confirmation returns either one of responses of "acceptable", "not desirable but acceptable", and "unacceptable", and the change-execution-result notifying unit transmits the change execution result only when the voltage monitoring device having sent a response of "not desirable but acceptable" is present.

8. A voltage monitoring device comprising:

a change-acceptance determining unit to perform an acceptance determination, which is either one of selections including at least "acceptable" and "unacceptable", with respect to a change-possibility confirmation of a target voltage range transmitted from a voltage controller that controls a voltage control device that changes a voltage of a bus, to which a plurality of power distribution lines are connected, such that the voltage of the bus is within the target voltage range; and a communication processing unit to receive the change-possibility confirmation and transmit the acceptance determination determined by the change-acceptance determining unit to the voltage controller.

9. The voltage monitoring device according to claim 8, comprising a target-voltage-range change request information generating unit to generate target-voltage-range change request information to be transmitted from the communication processing unit in order to request a change of the target voltage range to the voltage controller, when a monitored voltage, which is a voltage at a monitoring site, deviates from an appropriate voltage range, wherein the target-voltage-range change request information in an opposite direction to the change execution result is not transmitted until a preset period of time has passed since reception of the change execution result indicating a change by the communication processing unit.

10. The voltage monitoring device according to claim 9, wherein the change-acceptance determining unit predicts the monitored voltage after the change according to a change direction and a voltage change amount included in the change-possibility confirmation, and determines that a voltage change is unacceptable when the predicted monitored voltage deviates from the appropriate voltage range.

11. The voltage monitoring device according to claim 8, wherein the change-acceptance determining unit predicts the monitored voltage after the change according to a change direction and a voltage change amount included in the change-possibility confirmation, and determines that a voltage change is unacceptable when the predicted monitored voltage deviates from a legal voltage range.

12. The voltage monitoring device according to claim 11, wherein the change-acceptance determining unit predicts the monitored voltage after the change according to a change direction and a voltage change amount included in the change-possibility confirmation, and determines that a voltage change is not desirable but acceptable when the predicted monitored voltage is within the legal voltage range and the predicted monitored voltage deviates from an appropriate voltage range.

* * * * *